US009996218B2

(12) United States Patent
Murata

(10) Patent No.: US 9,996,218 B2
(45) Date of Patent: Jun. 12, 2018

(54) INFORMATION PROCESSING APPARATUS, INFORMATION PROCESSING METHOD, AND COMPUTER-READABLE RECORDING MEDIUM STORING INFORMATION PROCESSING PROGRAM

(71) Applicant: Jun Murata, Tokyo (JP)

(72) Inventor: Jun Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 615 days.

(21) Appl. No.: 14/259,552

(22) Filed: Apr. 23, 2014

(65) Prior Publication Data

US 2014/0237416 A1 Aug. 21, 2014

Related U.S. Application Data

(63) Continuation of application No. 12/050,394, filed on Mar. 18, 2008, now Pat. No. 8,751,959.

(30) Foreign Application Priority Data

Mar. 19, 2007 (JP) ................................. 2007-071600

(51) Int. Cl.
*G06F 3/0482* (2013.01)
*G06F 9/445* (2018.01)
(Continued)

(52) U.S. Cl.
CPC ........ *G06F 3/0482* (2013.01); *G06F 3/04842* (2013.01); *G06F 3/1225* (2013.01); *G06F 9/44526* (2013.01)

(58) Field of Classification Search
CPC .. H04W 76/023; G06F 3/1204; G06F 3/1205; G06F 3/122; G06F 3/1225; G06F 9/44526; H04N 2201/0094; H04N 1/32101
See application file for complete search history.

(56) References Cited

U.S. PATENT DOCUMENTS 6,148,336 A * 11/2000 Thomas .............. H04L 41/0893
                                          709/223
6,473,788 B1 * 10/2002 Kim .................... G06F 11/0709
                                          358/1.15
(Continued)

FOREIGN PATENT DOCUMENTS

JP    2001-51840     2/2001
JP    2002-373044    12/2002
(Continued)

OTHER PUBLICATIONS

Office Action dated Nov. 15, 2011 in Japanese Patent Application No. 2007-071600.
(Continued)

*Primary Examiner* — Tadesse Hailu
(74) *Attorney, Agent, or Firm* — Oblon, McClelland, Maier & Neustadt, L.L.P.

(57) ABSTRACT

An information processing apparatus is disclosed. The information processing apparatus executes a function corresponding to a menu item of application software which menu item is selected by a user. The information processing apparatus includes an information processing unit which executes plural small functions of which the function corresponding to the selected menu item is formed, a recipe data forming unit which forms recipe data in which an executing condition and an executing order of the plural small functions corresponding to the selected menu item are defined, and an information process executing unit which causes the information processing unit to execute the plural small functions based on the formed recipe data.

21 Claims, 26 Drawing Sheets

(51) Int. Cl.
*G06F 3/12* (2006.01)
*G06F 3/0484* (2013.01)

(56) References Cited

U.S. PATENT DOCUMENTS

| | | | |
|---|---|---|---|
| 6,860,422 B2 | 3/2005 | Hull | |
| 7,254,814 B1* | 8/2007 | Cormier | G06F 9/44526 717/120 |
| 2003/0200061 A1* | 10/2003 | Yamanaka | G06F 9/44526 702/188 |
| 2005/0057776 A1* | 3/2005 | Furukawa | H04N 1/40 358/2.1 |
| 2005/0166184 A1* | 7/2005 | Takao | G06F 9/4443 717/117 |
| 2005/0219578 A1* | 10/2005 | Hiraoka | H04N 1/00931 358/1.9 |
| 2006/0031753 A1* | 2/2006 | Fitzgerald | G06T 11/60 715/211 |
| 2006/0092454 A1* | 5/2006 | Narusawa | G06F 3/1208 358/1.15 |
| 2008/0016520 A1* | 1/2008 | Kong | G06F 9/44526 719/329 |
| 2008/0036757 A1* | 2/2008 | Furukawa | G11B 27/105 345/418 |
| 2009/0164933 A1* | 6/2009 | Pederson | G05B 19/409 715/772 |

FOREIGN PATENT DOCUMENTS

| | | |
|---|---|---|
| JP | 2004-62859 | 2/2004 |
| JP | 2004-152258 | 5/2004 |

OTHER PUBLICATIONS

Japanese Office Action dated Apr. 30, 2013 in Patent Application No. 2012-158678.

* cited by examiner

FIG.5

| | | | | |
|---|---|---|---|---|
| File (F) | Edit (E) | View (V) | Tool (T) | Help (H) |

C:¥Documents and Settings¥user01¥aaa¥bbb¥Plugins

Address (D) | C:¥Documents and Settings¥user01¥aaa¥bbb¥Plugins

| Name | Size | Type | UpdatedDate |
|---|---|---|---|
| AddTest | | FileFolder | 2004/10/02 16:28 |
| AppCurrentInput | | FileFolder | 2004/10/02 16:28 |
| ClipboardCopy | | FileFolder | 2004/10/02 16:28 |
| ConvertToPDF | | FileFolder | 2004/10/02 16:28 |
| FileInput | | FileFolder | 2004/10/02 16:28 |
| FileOperation | | FileFolder | 2004/10/02 16:28 |
| ImageColorChange | | FileFolder | 2004/10/02 16:28 |
| ImageFlip | | FileFolder | 2004/10/02 16:28 |
| ImageRotate | | FileFolder | 2004/10/02 16:28 |
| MessegeBox | | FileFolder | 2004/10/02 16:28 |
| OCR | | FileFolder | 2004/10/02 16:28 |
| Print | | FileFolder | 2004/10/02 16:28 |
| ResizeImage | | FileFolder | 2004/10/02 16:28 |
| SendMail | | FileFolder | 2004/10/02 16:28 |
| SearchFIle | | FileFolder | 2004/10/02 16:28 |
| ServerDelivery | | FileFolder | 2004/10/02 16:28 |
| ServerFAX | | FileFolder | 2004/10/02 16:28 |
| ServerPDFConvert | | FileFolder | 2004/10/02 16:28 |
| ServerPrint | | FileFolder | 2004/10/02 16:28 |
| ThumbnailCreater | | FileFolder | 2004/10/02 16:28 |

```
<?xml version="1.0" encoding="utf-16"?>
<CookFlowRecipe> ・・・Recipe Start Tag
  <RecipeProperty>
    <RecipeName>AAA</RecipeName> ・・・Recipe Name (Function Name)
    <RecipeType>BBB</RecipeType> ・・・Recipe Type
    <MenuName>CCC</MenuName> ・・・Menu Name
    <MenuZone>DDD</MenuZone> ・・・Menu Zone
  </RecipeProperty>
  <FlowPlugin name="XXXX"/> ・・・Recipe Start Tag of Process 1
    ・
    ・
    <FunctionProperty name = "EEE">aaa</FunctionProperty> ・・・Executing Condition of Process 1
  </FlowPlugin> ・・・Recipe Completion Tag of Process 1
  <FlowPlugin name="YYYY"> ・・・Recipe Start Tag of Process 2
    <RequestTypeName name="GGG"ref="XXXX"></RequestTypeName> ・・・Object to be processed of Process 2
    <FunctionProperty name = "FFF">bbb</FunctionProperty> ・・・Executing Condition of Process 2
    ・
    ・
  </FlowPlugin> ・・・Recipe Completion Tag of Process 2
</CookFlowRecipe> ・・・Recipe Completion Tag
```

71: Function Information
72: Information of Executing Condition & Executing Order

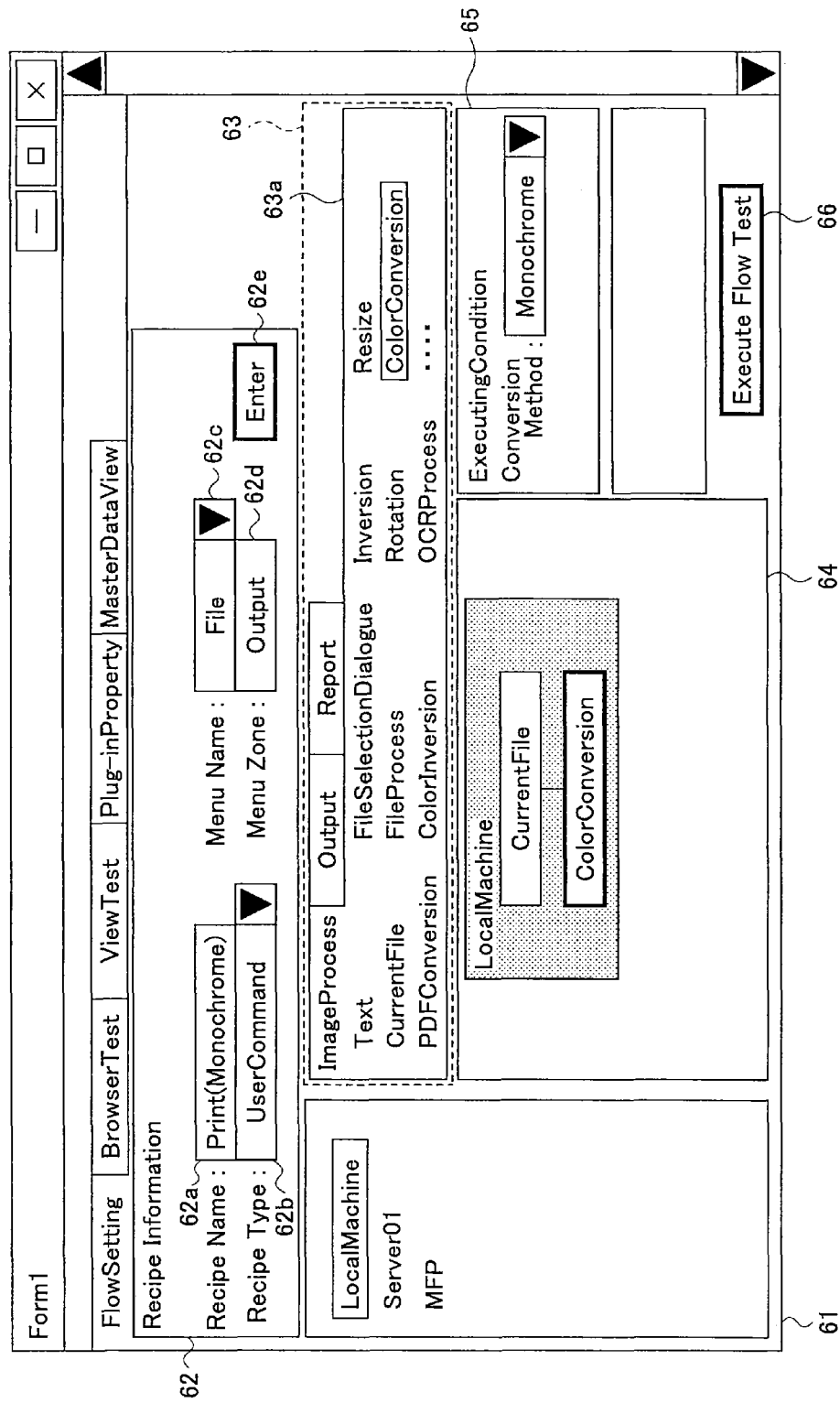

FIG.22

```
<?xml version="1.0" encoding="utf-16"?>
<CookFlowRecipe>
    <RecipeProperty>
        <RecipeName>InversionPrint</RecipeName>
        <RecipeType>UserCommand</RecipeType>
        <MenuName>File</MenuName>
        <MenuZone>Output</MenuZone>
    </RecipeProperty>
    <FlowPlugin name="CurrentFile"/>
    <FlowPlugin name="Inversion">
        <RequestTypeName name="InputFile" ref="CurrentFile"></RequestTypeName>
    </FlowPlugin>
    <FlowPlugin name="Print">
        <RequestTypeName name="InputFile" ref="Inversion"></RequestTypeName>
    </FlowPlugin>
</CookFlowRecipe>
```

71 — RecipeProperty block
72 — FlowPlugin block

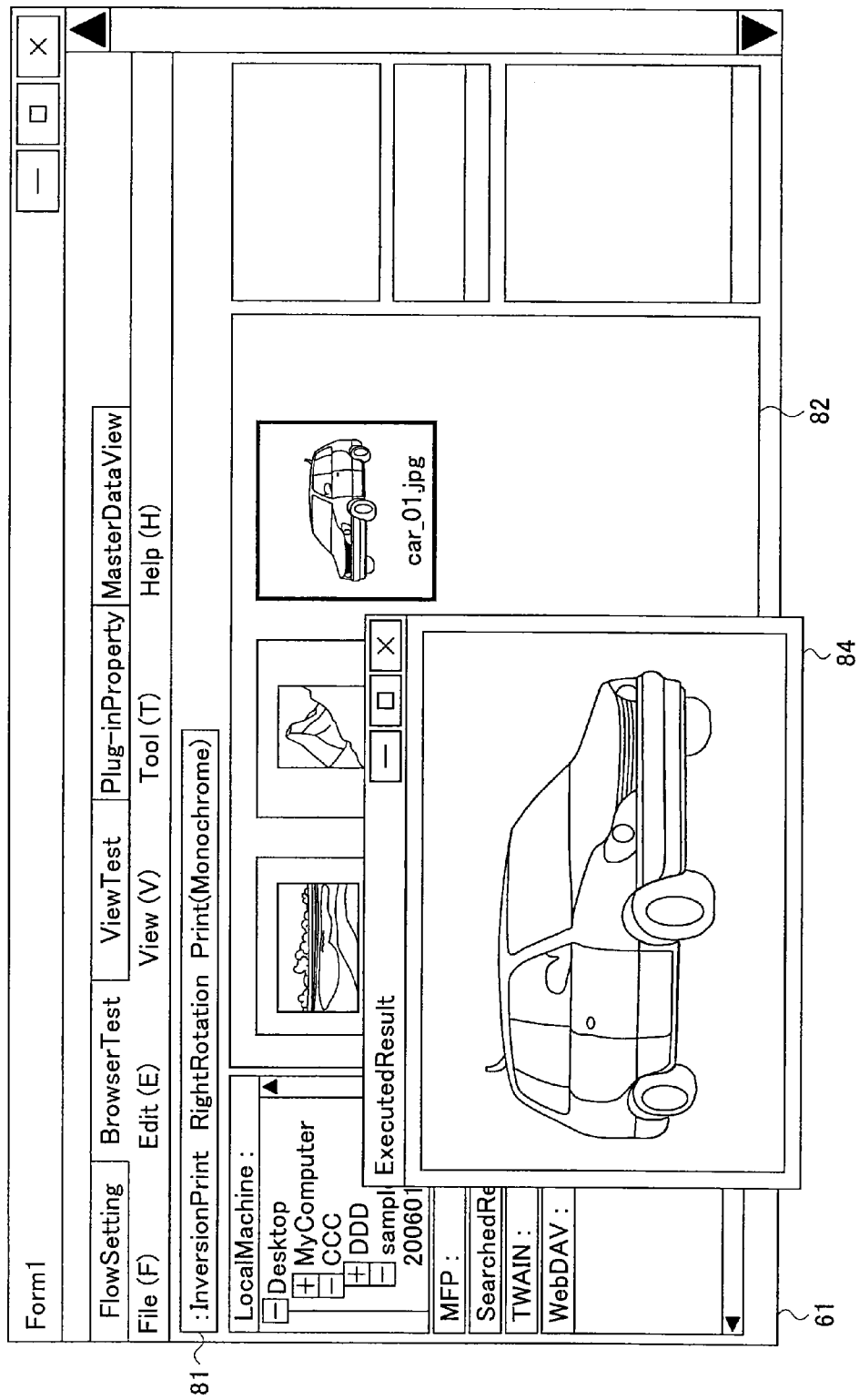

INFORMATION PROCESSING APPARATUS, INFORMATION PROCESSING METHOD, AND COMPUTER-READABLE RECORDING MEDIUM STORING INFORMATION PROCESSING PROGRAM

CROSS-REFERENCE TO RELATED APPLICATIONS

This application is a continuation of U.S. application Ser. No. 12/050,394, filed Mar. 18, 2008, and is based upon and claims the benefit of priority from prior Japanese Patent Application No. 2007-071600, filed Mar. 19, 2007.

BACKGROUND OF THE INVENTION

1. Field of the Invention

The present invention generally relates to an information processing apparatus, an information processing method, and a computer-readable recording medium storing an information processing program in which desktop application software is executed.

2. Description of the Related Art

When application software is used, the intended purpose of the application software is different among users.

Therefore, when a company develops and supplies application software, the company must consider whether the supplied application software sufficiently satisfies the purpose of the user; that is, the company must obtain high customer satisfaction from the supplied application software.

So that the user can expand the functions of the application software, the application software is developed by dividing functions into a basic function and an expansion function.

When the basic function and the expansion function are separately developed, the user can install the expansion function in an information processing apparatus where the basic function has been installed. With this, the user expands the function of the information processing apparatus.

A program which is developed to realize the expansion function is called a plug-in program.

In Patent Document 1, an integrated document managing system is disclosed. In the system, in order to execute data communications among the databases, a function for connecting the databases is provided separately from a program for managing documents as a database connecting function plug-in program.

In the integrated document managing system, when a user access a document via a user interface, the user can operate the system without considering the type of the database. In addition, when specifications of the data communications among the databases are changed, a database is changed or a new database is added. Since a plug-in program can correspond to the change, the system can be easily customized.

[Patent Document 1] Japanese Laid-Open Patent Application No. 2001-51840

However, when a user actually uses application software, the user combines functions supplied from plug-in programs corresponding to the intended purpose.

FIG. 1 is a diagram showing conventional processes and processes of an embodiment of the present invention when plug-in programs are used. As shown in FIG. 1, in the conventional processes, for example, when a user desires to execute a process "input image data are printed by having color conversion applied", the user must instruct executing a color conversion function plug-in program P1, which applies color conversion to input image data, and a print function plug-in program P2, which prints color converted image data, via corresponding user interfaces. That is, in the conventional processes, the user must separately instruct the plug-in programs P1 and P2 to execute the corresponding functions.

As described above, in the conventional processes, when the user executes a process in which functions supplied from plug-in programs are combined corresponding to the intended purpose, the process becomes complex. That is, the usability is not sufficient.

It is possible to design the combined functions as one plug-in program; however, the labor-hours and the cost for developing the combined functions are increased.

SUMMARY OF THE INVENTION

In a preferred embodiment of the present invention, there is provided an information processing apparatus, an information processing method, and a computer-readable recording medium storing an information processing program, in which desktop application software can be easily changed corresponding to the intended purpose of a user. For example, in FIG. 1, in the embodiment of the present invention, when the user desires to execute a process "input image data are printed by having color conversion applied", process related information such as information of the executing order of the color conversion function plug-in program P1 and the print function plug-in program P2 for realizing the process by application software is defined as data D, and the color conversion function plug-in program P1 and the print function plug-in program P2 are automatically executed based on the data D.

Features and advantages of the present invention are set forth in the description that follows, and in part will become apparent from the description and the accompanying drawings, or may be learned by practice of the invention according to the teachings provided in the description. Features and advantages of the present invention will be realized and attained by an information processing apparatus, an information processing method, and a computer-readable recording medium storing an information processing program particularly pointed out in the specification in such full, clear, concise, and exact terms so as to enable a person having ordinary skill in the art to practice the invention.

To achieve one or more of these and other advantages, according to one aspect of the present invention, there is provided an information processing apparatus which executes a function corresponding to a menu item of application software which menu item is selected by a user. The information processing apparatus includes an information processing unit which executes plural small functions of which the function corresponding to the selected menu item is formed, a recipe data forming unit which forms recipe data in which an executing condition and an executing order of the plural small functions corresponding to the selected menu item are defined and an information process executing unit which causes the information processing unit to execute the plural small functions based on the formed recipe data.

According to another aspect of the present invention, there is provided an information processing method which executes a function corresponding to a menu item of application software which menu item is selected by a user in an information processing apparatus. The information processing method includes an information processing step which executes plural small functions of which the function corresponding to the selected menu item is formed, a recipe data forming step which forms recipe data in which an executing condition and an executing order of the plural small functions corresponding to the selected menu item are defined, and an information process executing step which causes the information processing step to execute the plural small functions based on the formed recipe data.

According to another aspect of the present invention, there is provided a computer-readable recording medium storing an information processing program in an information processing apparatus. The information processing program executes a function corresponding to a menu item of application software which menu item is selected by a user. The information processing program includes an information processing step which executes a plurality of small functions of which the function corresponding to the selected menu item is formed, a recipe data forming step which forms recipe data in which an executing condition and an executing order of the plural small functions corresponding to the selected menu item are defined and an information process executing step which causes the information processing step to execute the plural small functions based on the formed recipe data.

Effect of the Invention

According to an embodiment of the present invention, in order to realize a user desired function by using plug-in programs (plural small functions) on desktop application software, data having a predetermined format are formed. In the data, the executing order and the executing conditions of the plug-in programs are defined. The desktop application software executes the user desiring function based on the data. Since the data can be easily changed based on the intended purpose of the user, an information processing apparatus whose function is changed can be easily provided.

BRIEF DESCRIPTION OF THE DRAWINGS

Features and advantages of the present invention will become more apparent from the following detailed description when read in conjunction with the accompanying drawings, in which:

FIG. 5 is a diagram showing a storing status of plug-in programs of the function plug-in software according to the embodiment of the present invention;

FIG. 6 is a diagram showing a structure of recipe data shown in FIG. 4;

FIG. 7 is a diagram showing a screen on which a user defines function information and information of the executing conditions and the executing order of plug-in programs in the recipe data when an image process is executed;

FIG. 22 is a diagram showing recipe data in the image inverting print function;

FIG. 23 is a diagram showing a displaying screen when the image inverting print function is executed;

DESCRIPTION OF THE PREFERRED EMBODIMENT

Best Mode of Carrying Out the Invention

The best mode of carrying out the present invention is described with reference to the accompanying drawings.

[Hardware Structure of Information Processing Apparatus]

Figure 1:
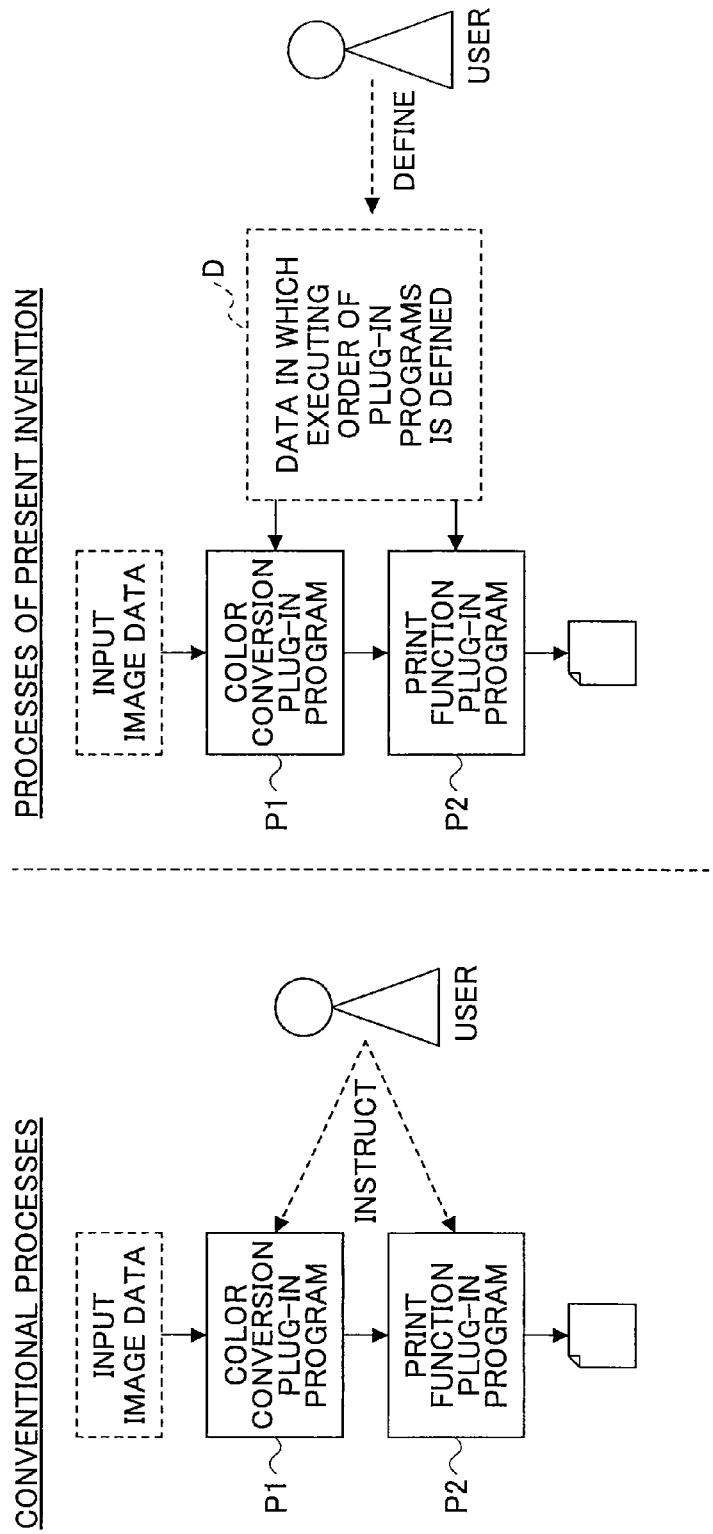
FIG. 1 is a diagram showing conventional processes and processes of an embodiment of the present invention when plug-in programs are used.
Figure 2:
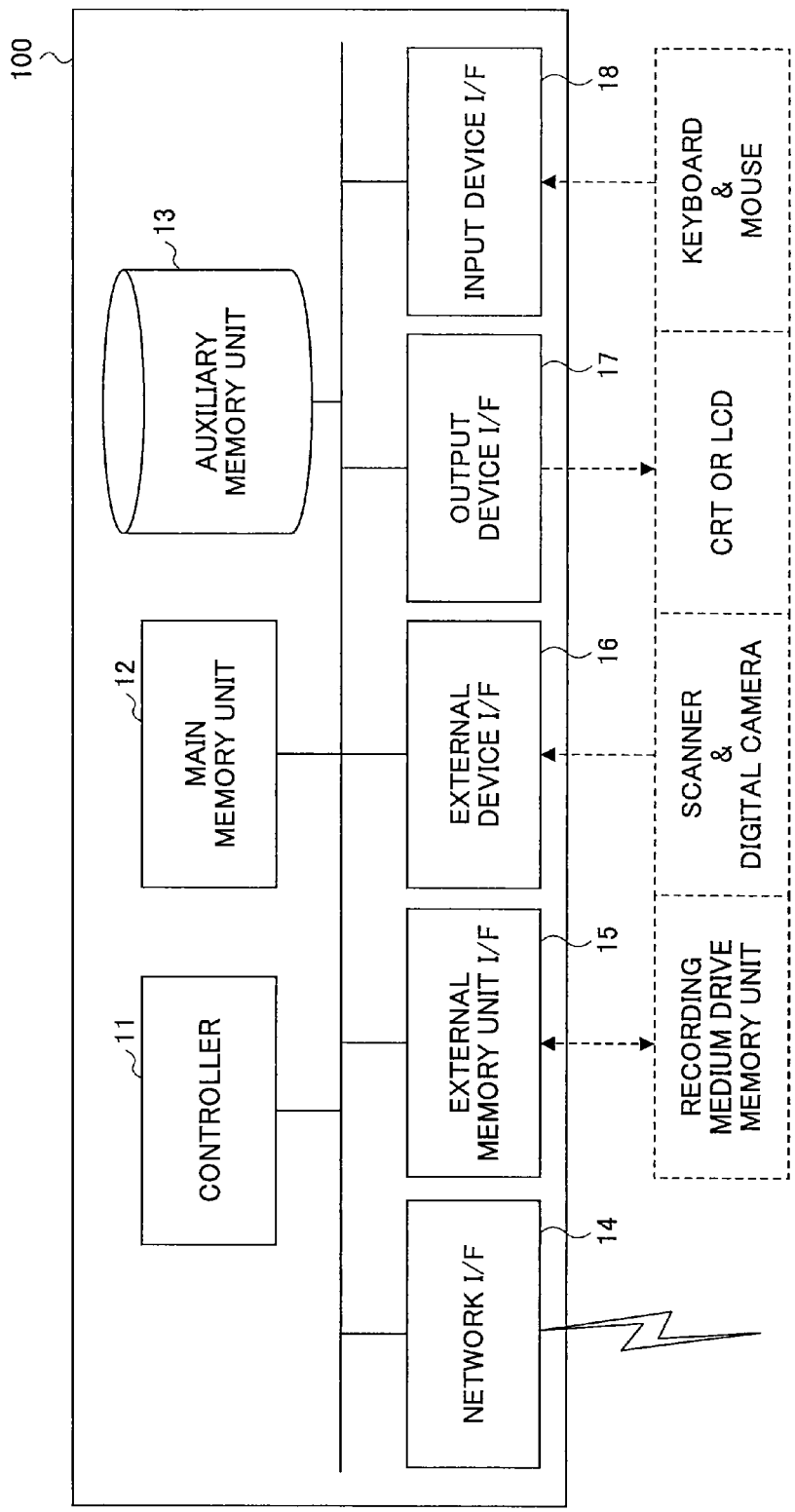
FIG. 2 is a hardware structure of an information processing apparatus according to the embodiment of the present invention.

Referring to FIG. 2, a hardware structure of an information processing apparatus 100 according to an embodiment of the present invention is described.

FIG. 2 is the hardware structure of the information processing apparatus 100 according to the embodiment of the present invention.

As shown in FIG. 2, the information processing apparatus 100 includes a controller 11, a main memory unit 12, an auxiliary memory (secondary storage) unit 13, a network I/F (interface) 14, an external memory unit I/F 15, an external device I/F 16, an output device I/F 17, and an input device I/F 18.

The controller 11 is a CPU (central processing unit) and controls the main memory unit 12, the auxiliary memory unit 13, the network I/F 14, the external memory unit I/F 15, the external device I/F 16, the output device I/F 17, and the input device I/F 18.

Specifically, for example, the controller 11 executes programs stored in the main memory unit 12 and the auxiliary memory unit 13. That is, the controller 11 receives data from an input device via the input device I/F 18 or from an external memory unit via the external memory unit I/F 15, processes the data, and outputs the processed data to an output device or a memory unit. For example, the controller 11 controls displaying a character on a display which character is input on a keyboard.

The main memory unit 12 includes a ROM (read only memory) and a RAM (random access memory) and stores data and a program which is executed by the controller 11. Specifically, the ROM stores the data and the program, and the controller 11 loads the data and the program in the RAM corresponding to a process, and executes the program and processes the data.

The auxiliary memory unit 13 is, for example, a HD (hard disk) and stores the OS (operating system) of the information processing apparatus 100, an application program including an information processing program, a plug-in program for expanding a function, and data related to the programs. In addition, the auxiliary memory unit 13 stores information which is managed by the information processing apparatus 100 which information includes recipe information in which the executing conditions and the executing order of plug-in programs are defined. The information is managed by a database or a file system.

The network I/F 14 connects the information processing apparatus 100 to another apparatus, for example, another information processing apparatus or an image processing apparatus having a communication function connected via a network, for example a LAN (local area network) or a WAN (wide area network) formed by a wired or wireless data transmission line.

The external memory unit I/F 15 connects the information processing apparatus 100 to an external memory unit, for example, a recording medium driver memory unit connected via a data transmission line such as a USB (universal serial bus).

The external device I/F 16 connects the information processing apparatus 100 to an external input device, for example, a scanner or a digital camera connected via a data transmission line such as a USB.

By using the above interfaces, the information processing apparatus 100 receives data from an external device and transmits data to the external device, and reads data from an external memory unit and writes data in the external memory unit.

The output device I/F 17 connects the information processing apparatus 100 to an output device, for example, a CRT (cathode ray tube) or a LCD (liquid crystal display) via a data transmission line such as a dedicated cable.

The input device I/F 18 connects the information processing apparatus 100 to an input device, for example, a keyboard or a mouse via a data transmission line such as a USB.

As described above, the information processing apparatus 100 executes the information processing program stored in the main memory unit 12 or the auxiliary memory unit 13 by controlling the elements in the apparatus 100. With this, desktop application software which can be easily changed corresponding to the intended purpose of a user is realized.

[Software Structure of Information Processing Apparatus]

Figure 3:
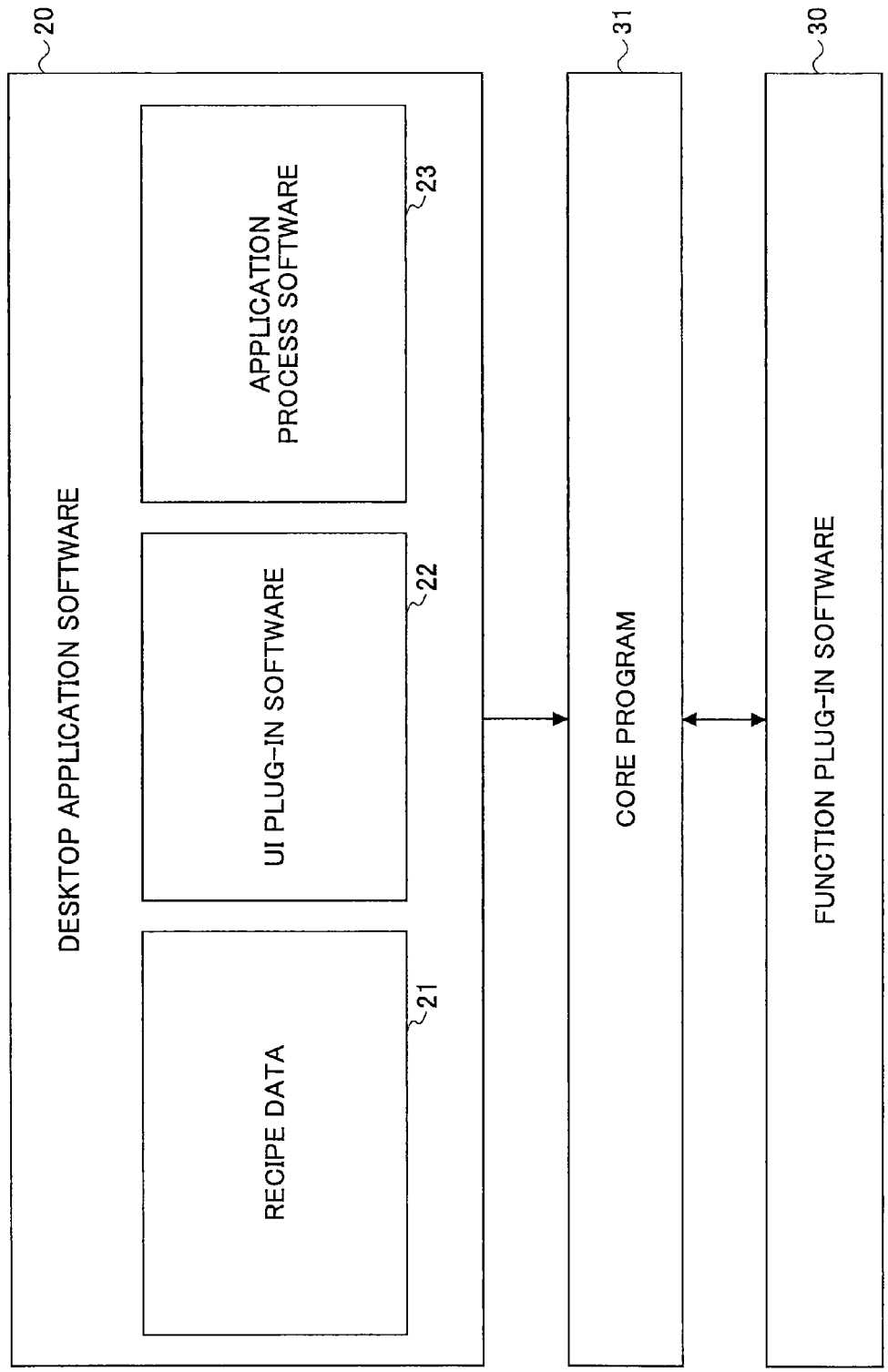
FIG. 3 is a software structure of the information processing apparatus according to the embodiment of the present invention.

Referring to FIG. 3, a software structure of the information processing apparatus 100 according to the embodiment of the present invention is described.

FIG. 3 is a software structure of the information processing apparatus 100 according to the embodiment of the present invention.

As shown in FIG. 3, the information processing apparatus 100 includes desktop application software 20, function plug-in software 30, and a core program 31.

The desktop application software 20 includes recipe data 21, UI (user interface) plug-in software 22, and application process software 23. In the desktop application software 20, the recipe data 21 are software (described below).

The recipe data 21 are information (data) of a predetermined format in which information concerning operations such as the executing conditions and the executing order of plug-in programs is defined for realizing a process by the desktop application software 20. The recipe data 21 are formed of plural data items.

The UI plug-in software 22 is formed of plural plug-in programs (modules) for realizing the UIs of the desktop application software 20. Each plug-in program realizes a minimum unit of function (small function).

The application process software 23 is a program for executing a process by being allocated a usable memory region of the RAM in the main memory unit 12 by the OS. The process is, for example, a process to display a UI image on the output device such as a CRT or a LCD by using a UI plug-in program (one of UI parts), and a process to form the recipe data 21 based on information concerning operations received from the displayed UI image.

The function plug-in software 30 is a program for executing a predetermined information process so as to realize a function of the desktop application software 20, and is formed of plural plug-in programs (modules; small functions). The predetermined information process is an information process for realizing a minimum unit of function of the desktop application software 20. That is, the information process is, for example, a file selecting process, a color converting process, an image printing process, and a message displaying process.

The core program 31 is a program commonly used by the desktop application software 20 and the function plug-in software 30 and is formed of plural programs (modules). The core program 31 is, for example, a program for executing a plug-in program in the function plug-in software 30 based on the information concerning the operations such as the executing conditions and the executing order defined in the recipe data 21, and a data interface program interfacing between the desktop application software 20 and the function plug-in software 30.

The desktop application software 20 operates as described below. In the following, a case is described in which a menu item of the desktop application software 20 is selected by a user.

(1) The UI plug-in software 22 receives a user instruction.

(2) The application process software 23 sends the instruction to the core program 31.

(3) The core program 31 identifies recipe data 21 in which the information concerning the instructed operations is defined based on the instruction received from the application process software 23. In this case, one data item of the recipe data 21 in the plural data items of the recipe data 21 is identified based on the menu item. A plug-in program in the function plug-in software 30 is executed based on the information concerning the operations such as the executing conditions and the executing order.

As described above, the desktop application software 20 loads the above described programs and data in an allocated memory region of the RAM of the main memory unit 12, and the loaded programs are executed by the controller 11. With this, a process instructed by the user is executed on the desktop application software 20.

[Units for Realizing Main Functions of Information Processing Apparatus]

Next, units for realizing main functions of the information processing apparatus 100 are described.

Figure 4:
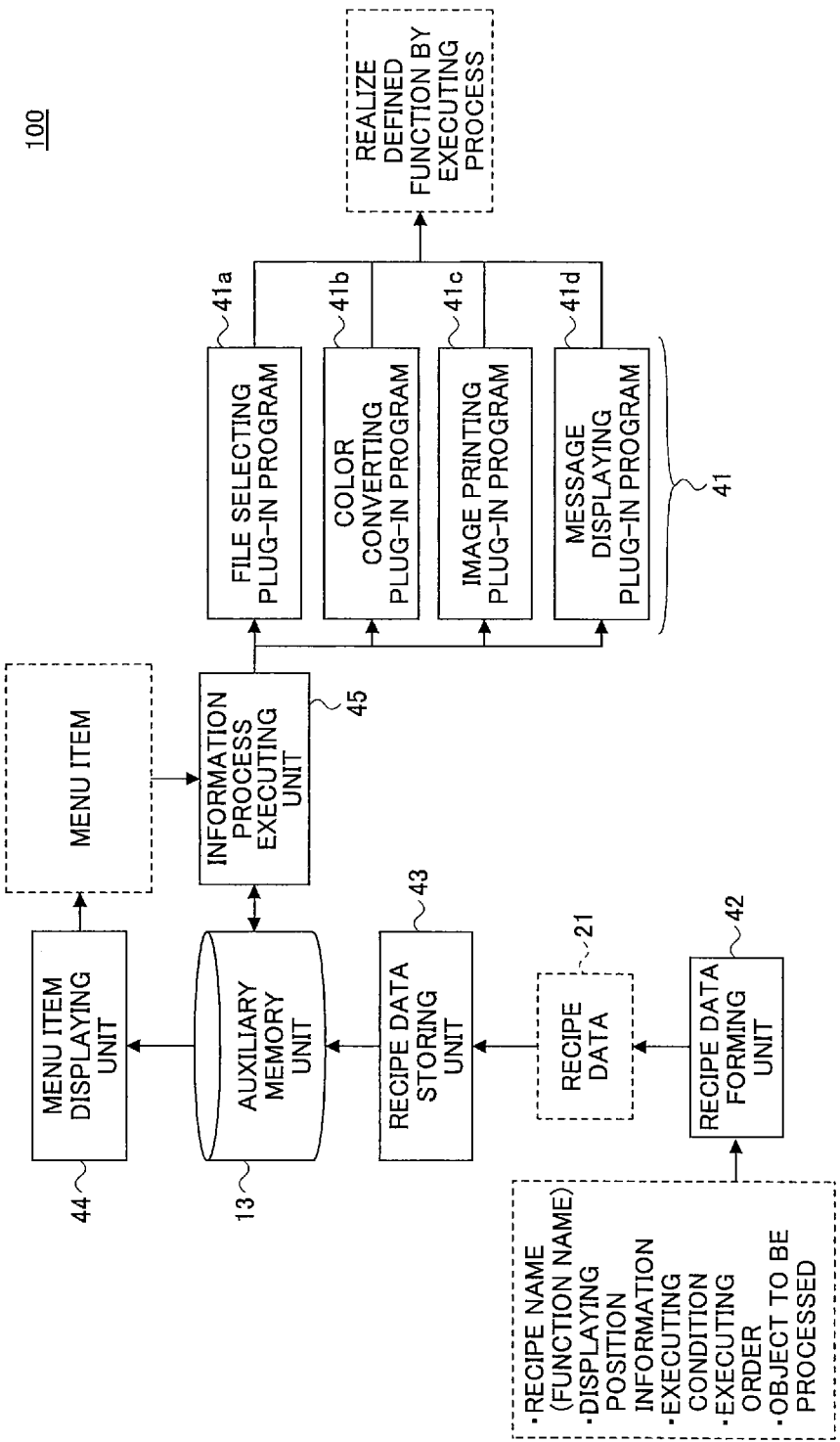
FIG. 4 is a diagram showing units for realizing main functions of the information processing apparatus according to the embodiment of the present invention.

FIG. 4 is a diagram showing the units for realizing the main functions of the information processing apparatus 100 according to the embodiment of the present invention.

As shown in FIG. 4, in order to realize the functions of the information processing apparatus 100, the information processing apparatus 100 includes an information processing unit 41, a recipe data forming unit 42, a recipe data storing unit 43, a menu item displaying unit 44, and an information process executing unit 45.

The information processing unit 41 executes a predetermined process for realizing the function of the desktop application software 20.

In this case, the information processing unit 41 includes, for example, a file selecting plug-in program 41a, a color converting plug-in program 41b, an image printing plug-in program 41c, and a message displaying plug-in program 41d.

That is, when the controller 11 executes the plug-in programs (small functions) in the function plug-in software 30, the information processing unit 41 is realized.

First, the information processing unit 41 is described in detail.

The recipe data forming unit 42, the recipe data storing unit 43, the menu item displaying unit 44, and the information process executing unit 45 are described below.

FIG. 5 is a diagram showing a storing status of plug-in programs of the function plug-in software 30.

The plug-in programs of the function plug-in software 30 are stored in a predetermined region of a non-volatile memory unit, for example, the auxiliary memory unit 13 by an installer, when the desktop application software 20 is installed in the information processing apparatus 100 or when a plug-in program is additionally installed in the function plug-in software 30.

The installer designates a storing region of a non-volatile memory unit, for example, the auxiliary memory unit 13, based on a storing address (folder path) like "C:¥Documents and Settings¥user01¥aaa¥bbb¥Plugins" shown in FIG. 5, and stores a plug-in program in the designated address.

In FIG. 5, the plug-in programs of the function plug-in software 30 are displayed on a browsing window 51 which manages files and folders of, for example, Explorer (registered Trademark), as a list.

Returning to FIG. 4, the information processing unit 41 realizes a plug-in program (minimum unit of function) by being loaded in the RAM of the main memory unit 12 from the auxiliary memory unit 13 by the controller 11 based on a user instruction. That is, the file selecting plug-in program 41a, the color converting plug-in program 41b, the image printing plug-in program 41c, and the message displaying plug-in program 41d are executed.

In addition, the information processing unit 41 executes an image processing process (image processing function) for data input to the information processing apparatus 100, an image data output process (output function) for input data or processed data, and a reporting process (information reporting function) for reporting the processed result of the process to the user on the CRT or the LCD. These processes (functions) to be executed by corresponding plug-in programs are not shown in FIG. 4.

The recipe data forming unit 42 forms the recipe data 21 in which information concerning operations of the executing conditions and the executing order of the plug-in programs of the function plug-in software 30 for realizing the process by the desktop application software 20 is defined in a predetermined format.

Referring to FIG. 6, the recipe data 21 are described. FIG. 6 is a diagram showing a structure of the recipe data 21. In FIG. 6, the recipe data 21 are described by XML (extensible markup language).

XML is one of markup languages which describe the meaning and the structure of a document or data by a specific character string called a tag. A user can designate a specific tag.

By using such a language characteristic, the recipe data 21 are defined by describing information concerning operations (for example, "Proc_1") between a specific "recipe start tag" (for example, "<Tag>") and a specific "recipe completion tag" (for example, "</Tag>". That is, the information concerning operations is placed between the recipe start tag and the recipe completion tag.

In addition, by using the recipe start tag and the recipe completion tag, the structure of data to be defined can be a layered structure. For example, when the recipe start tag and the recipe completion tag of a recipe B are inserted between the recipe start tag and the recipe completion tag of a recipe A, the recipe start tag and the recipe completion tag of a recipe C are inserted between the recipe start tag and the recipe completion tag of the recipe B, and the recipe start tag and the recipe completion tag of a recipe D are inserted between the recipe start tag and the recipe completion tag of the recipe C; the structural element of the recipe A becomes the recipe B, and the structural elements of the recipe B becomes the recipes C and D. That is, when tags are nested between a pair of tags, the structure of data to be defined can be a layered structure.

The information concerning operations which is defined in the recipe data 21 has three pieces. First information is function information in which a process to be executed by the desktop application software 20 is defined as one function. Second information is information of the executing conditions and the executing order of the information processing unit 41 (the plug-in programs in the function plug-in software 30) for realizing the process with the desktop application software 20. Third information is information of an object to be executed by the information processing unit 41 (the plug-in program in the function plug-in software 30).

[Function Information]

The function information includes a recipe name (function name), a recipe type, a menu name, and menu zone.

The recipe name is a function name in which a process to be executed by plural plug-in programs of the information processing unit 41 is defined as one function.

The recipe type is a type of a function, for example, a type of a system side function or a type of a user side function.

The menu name is a name when a function is displayed as one of menu items of the desktop application software 20.

The menu zone is a zone where the function is displayed as one of menu items of the desktop application software 20.

[Information of Executing Conditions and Executing Order]

The executing conditions are parameters for controlling a process when the information processing unit 41 executes a plug-in program in the function plug-in software 30.

The executing order is the processing order of the plug-in programs in the function plug-in software 30 by the information processing unit 41. In FIG. 6, a process 1 and a process 2 are executed in this order.

[Information of Object to be Executed]

The information of the object to be executed shows a name of data to be processed by a plug-in program of the information processing unit 41 and a name of a plug-in program that outputs the data.

The information described above is defined by specific tags in the recipe data 21 shown in FIG. 6.

[Tags in which Plural Plug-in Programs to be Executed by Information Processing Unit 41 are Defined as One Function]

In FIG. 6, the following tags are defined.

<CookFlowRecipe>: Recipe Start Tag
</CookFlowRecipe>: Recipe Completion Tag

[Tags for Defining Function Information]
<RecipeProperty>: Recipe Start Tag of Function Information
<RecipeName>AAA</RecipeName>: Start Tag and Completion Tag which define information AAA showing Recipe Name (Function Name)
<RecipeType>BBB</RecipeType>: Start Tag and Completion Tag which define information BBB showing Recipe Type
<MenuName>CCC</Menu Name>: Start Tag and Completion Tag which define information CCC showing Menu Name)
<MenuZone>DDD</Menu Name>: Start Tag and Completion Tag which define information DDD showing Menu Zone
</RecipePropery>: Completion Tag of definition of Function Information

[Tags for defining Information of Executing Conditions and Executing Order]
<FlowPlugin name="XXXX">: Recipe Start Tag of Executing Conditions and Executing Order of Process "XXXX"
<FunctionProperty name="EEE">aaa</FunctionProperty>: Start Tag and Completion Tag of Executing Condition of a value "aaa" of a Control Parameter "EEE"
</FlowPlugin>: Recipe Completion Tag of Executing Conditions and Executing Order of Process "XXXX"

[Tag for Defining Information of Object to be Executed]
<RequestTypeName name="GGG"ref="XXXX"></RequestTypeName>: Recipe Start Tag and Recipe Completion Tag of Information of Data "GGG" to be executed output from Process "XXXX"

As shown in FIG. 6, the recipe data 21 defined by using the start and completion tags are formed of data items 71 in which the function information is defined and data items 72 in which the information of the executing conditions and the executing order and the information of object to be executed are defined.

As described above, the recipe data forming unit 42 forms the recipe data 21 in which the information concerning operations is described in a predetermined format by using the tags.

As described above, the recipe data forming unit 42 defines the processes which are executed by the plug-in programs 41a through 41d of the information processing unit 41 as one function of the desktop application software 20. That is, the processes are executed by combining the plural plug-in programs of the function plug-in software 30.

That is, in the information processing apparatus 100, the information concerning operations such as the executing conditions and the executing order of the plug-in programs which are desired to be executed by a user by using the desktop application software 20 is defined in the recipe data 21. With this, the user can execute the programs as one function of the desktop application software 20.

Next, referring to the drawings, a method defining the information concerning operations such as the executing conditions and the executing order of the plug-in programs which are desired to be executed by a user is described. In addition, a method forming the recipe data 21 by the recipe data forming unit 42 is described.

In the following, a case is described in which a process "input image data are printed by having color conversion applied" is defined as one function (monochrome printing function) of the desktop application software 20.

[Definition of Function Information]

First, referring to FIG. 7, a method defining the function information by a user is described.

FIG. 7 is a diagram showing a screen on which a user defines the function information and the information of the executing conditions and the executing order of the plug-in programs in the recipe data 21 when an image process is executed.

When a user starts up the desktop application software 20 of the information processing apparatus 100, as shown in FIG. 7, an application window 61 (screen) is displayed by the application process software 23.

The application window 61 provides a function information setting zone 62 as a UI zone in which the function information is set.

The function information setting zone 62 provides a text box 62a, a pull-down menu 62b, a pull-down menu 62c, a text box 62d, and an enter button 62e. A recipe name (function name) is input at the text box 62a. A recipe type is selected at the pull-down menu 62b. When a recipe function is displayed as one menu item of the desktop application software 20, a menu name of the recipe function is selected at the pull-down menu 62c. That is, in the function information setting zone 62, recipe information is selected for setting the function information.

When the recipe function is displayed as one menu item of the desktop application software 20, a menu zone on which the menu item is displayed is set at the text box 62d. When the function information and the information of the executing conditions and the executing order are set, the enter button 62e is pushed.

A user inputs text data (setting values) to the text boxes 62a and 62d from an input device, for example, a key board, and selects corresponding set values at the pull-down menus 62b and 62c. With this, information for forming the data items 71 of the recipe data 21 by the recipe data forming unit 42 is set.

In FIG. 7, as described above, since the process "input image data are printed by having color conversion applied" is executed, "Print (Monochrome)" is set as the recipe name, "User Command" is selected as the recipe type, "File" is selected as the menu name, and "Output" is set as the menu zone. With this, the process is defined as one function of the desktop application software 20.

As described above, the recipe data forming unit 42 forms the data items 71 in which the function information is defined. Specifically, between the tags <RecipeProperty> and </RecipeProperty>, the tags of the recipe name, the recipe type, the menu name, and the menu zone are inserted together with the corresponding values (for example, character strings and numerical values) set via the UIs of the function information setting zone 62.

[Definition of Information of Executing Conditions and Executing Order and Information of Object to be Executed]

Figure 8:
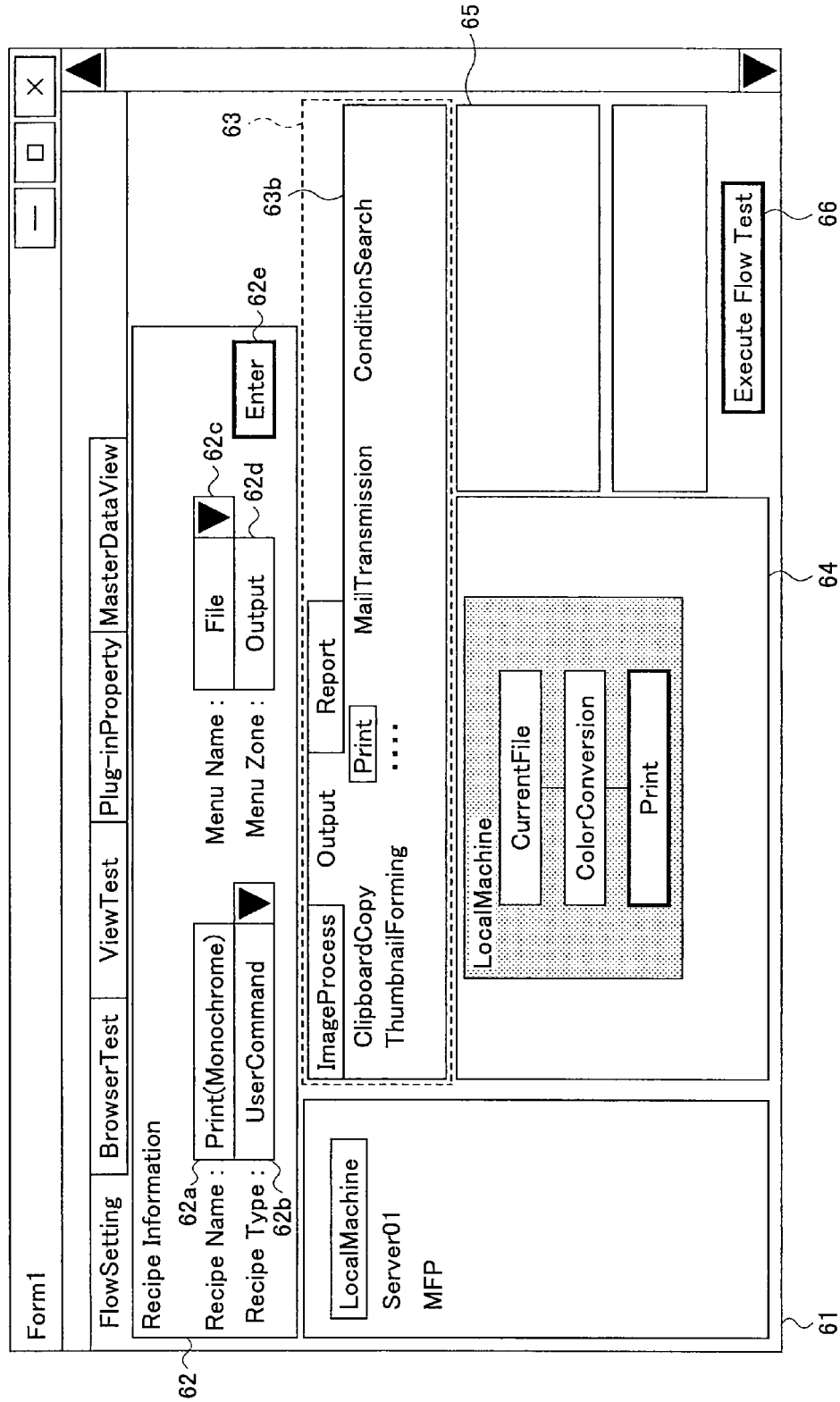
FIG. 8 is a diagram showing a screen on which a user defines the recipe data when an output process is executed.
Figure 9:
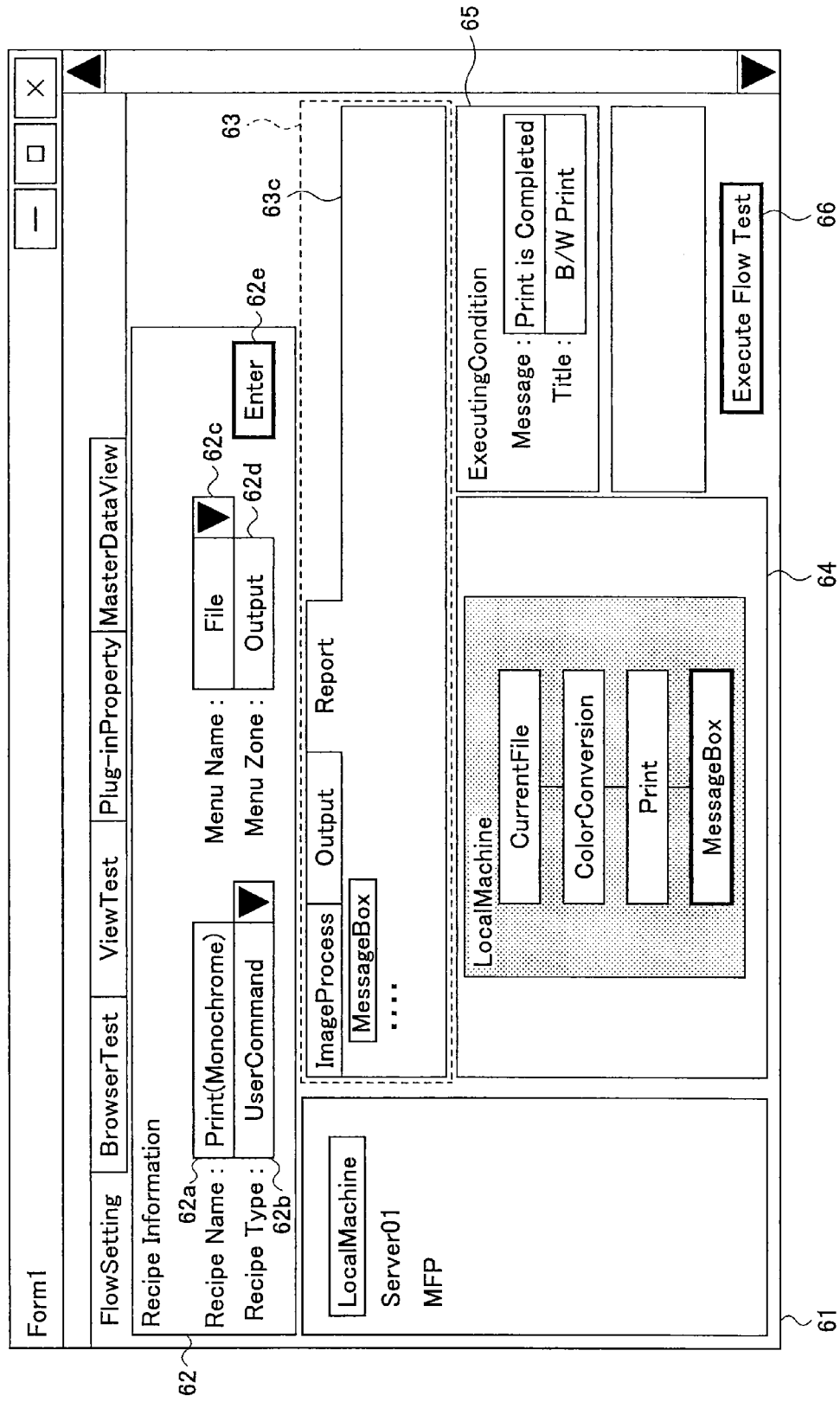
FIG. 9 is a diagram showing a screen on which a user defines the recipe data when an information reporting process is executed.

Referring to FIGS. 7 through 9, a method defining the information of the executing conditions and the executing order of the plug-in programs by a user is described.

The application window 61 provides an executing order setting zone 64 on which the executing order of the plug-in programs is set and an executing condition setting zone 65 on which the executing conditions of the programs are set as UI zones.

In addition, the application window 61 provides a plug-in program selecting zone 63 on which plug-in programs are selected which plug-in programs are objects for the information of the executing order and the executing conditions. As shown in FIG. 7, in the plug-in program selecting zone 63, a list of the plug-in programs of the function plug-in software 30 are displayed. The plug-in programs of the function plug-in software 30 are stored in a non-volatile memory unit, for example, the auxiliary memory unit 13 of the information processing apparatus 100.

When a user sets the information of the executing order, the user selects plug-in programs from the list displayed on the plug-in program selecting zone 63 by using a pointing device, for example, a mouse so that a desired process is realized by using the desktop application software 20. When the user uses the mouse, the user drags the selected status of the plug-in program to the executing order setting zone 64 and drops it in the executing order setting zone 64. With this, the executing order of the plug-in programs is set.

When the user sets the information of the executing conditions, the user selects executing conditions on the executing condition setting zone 65.

With this, when the recipe data forming unit 42 forms the recipe data 21, the processes to form the data items 72 shown in FIG. 6 are executed.

In the following description, the mouse is used as the pointing device.

[A: Definition of Image Process]

When a user sets an image processing function which is provided in the plug-in programs of the function plug-in software 30 installed in the information processing apparatus 100, first, the user clicks "Image Process" in the plug-in program selecting zone 63 by using the mouse so that the list of the plug-in programs of the function plug-in software 30 (a plug-in program selecting region 63a of the "Image Process") is displayed.

Then the user selects a plug-in program from the list by using the mouse and drags the program to the executing order setting zone 64 and drops the selected plug-in program.

In FIG. 7, in order to realize the process "input image data are printed by having color conversion applied", the user drags "ColorConversion" in the list by using the mouse and drops it at a position under "CurrentFile" in the executing order setting zone 64. As shown in FIG. 4, first, "Current-File" of the file selecting plug-in program 41a has been selected; therefore, "ColorConversion" is placed at the position under "CurrentFile".

When the user sets the information of the executing conditions (control parameter), the user sets the executing conditions in the executing condition setting zone 65. The user can select a condition from a pull-down menu when the pull-down menu is available, and the user can input a value by using the keyboard when a text box is available.

In FIG. 7, as an executing condition, "Monochrome" is selected.

[B: Definition of Output Process]

FIG. 8 is a diagram showing a screen on which a user defines the recipe data 21 when an output process is executed.

When a user sets an output function which is provided in the plug-in programs of the function plug-in software 30 installed in the information processing apparatus 100, similar to the case of the image process function, the user clicks "Output" in the plug-in program selecting zone 63 by using the mouse so that the list of the plug-in programs of the function plug-in software 30 (a plug-in program selecting region 63b of the "Output") is displayed.

Then the user selects a plug-in program from the list by using the mouse and drags the program to the executing order setting zone 64 and drops the selected plug-in program.

In FIG. 8, in order to realize the process "input image data are printed by having color conversion applied", the user drags "Print" in the list by using the mouse and drops it at a position under "ColorConversion" in the executing order setting zone 64. Since "Print" is executed after "ColorConversion", "Print" is placed at the position under "ColorConversion".

[C: Definition of Information Reporting Process]

FIG. 9 is a diagram showing a screen on which a user defines the recipe data 21 when an information reporting process is executed.

When a user sets an information reporting function which is provided in the plug-in programs of the function plug-in software 30 installed in the information processing apparatus 100, similar to the case of the image process function, the user clicks "Report" in the plug-in program selecting zone 63 by using the mouse so that the list of the plug-in programs of the function plug-in software 30 (a plug-in program selecting region 63c of the "Report") is displayed.

Then the user selects a plug-in program in the list by using the mouse and drags the program to the executing order setting zone 64 and drops the selected plug-in program.

In FIG. 9, in order to realize the process "input image data are printed by having color conversion applied", the user drags "MessageBox" corresponding to the message displaying plug-in program 41c (refer to FIG. 4) in the list by using the mouse and drops it at a position under "Print" in the executing order setting zone 64. Since the information reporting function is executed after "Print", "MessageBox" is placed at the position under "Print".

In addition, in the message displaying plug-in program 41d, executing conditions (control parameters) can be set.

In FIG. 9, as an example, in the executing condition setting zone 65, "Print is Completed" is input as "Message", and "B/W Print" is input as "Title".

As described above, the recipe data forming unit 42 forms the data items 72 in which the information of the executing conditions and the executing order of the plug-in programs and the information of the object to be processed are defined, based on the order of the plug-in programs (the information processing units 41a through 41d) dropped by the user in the executing order setting zone 64. Specifically, as shown in FIG. 6, between the tag <Flowplugin name="XXXX"> and the tag </Flowplugin>, the name of the object to be processed of the information processing unit 41, the recipe start tag and the recipe completion tag of the object to be processed, the control parameter set in the executing condition setting zone 65, and the recipe start tag and the recipe completion tag of the executing conditions are inserted; then the above process is repeated by the number of the plug-in programs which are required to execute the object.

As described above, when the executing order of the plug-in programs (the information processing units 41a through 41d) is determined, the objects to be processed by the plug-in programs are determined and the information of the objects to be processed is determined.

By the processes defined in A through C, in the information processing apparatus 100, a user sets information of operations which are to be executed by the desktop application software 20.

Figure 10:
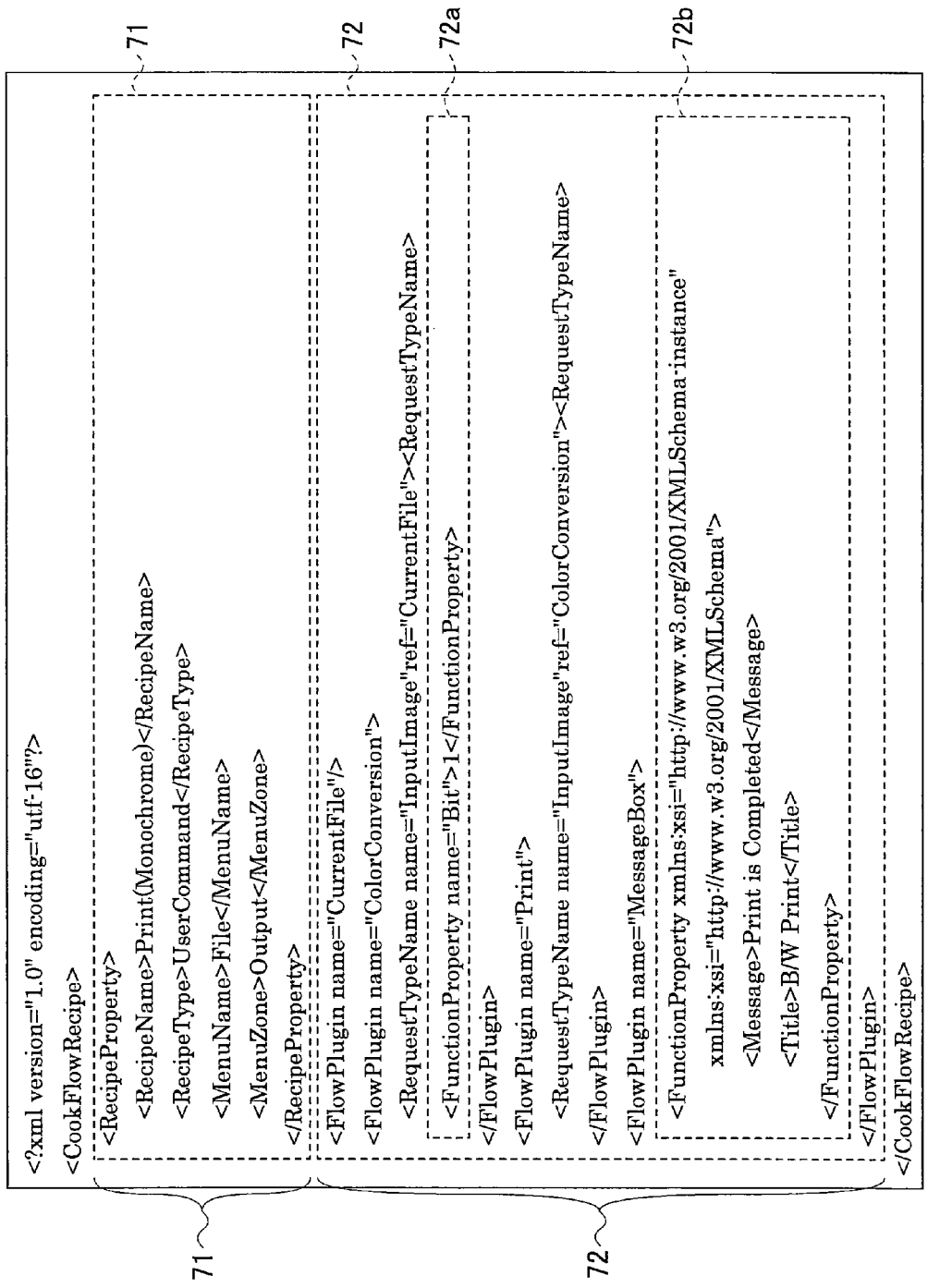
FIG. 10 is a diagram showing an example of the recipe data.

FIG. 10 is a diagram showing an example of the recipe data 21. In FIG. 10, a case of a monochrome print function is shown.

When a user sets information of the process "input image data are printed by having color conversion applied", via the UI of the desktop application software 20, corresponding to the processes defined in A through C, the recipe data 21 shown in FIG. 10 are formed.

In FIG. 10, between the tag <RecipeProperty> and the tag </RecipeProperty>, the data items 71 which define the function information are formed by the processes shown in FIG. 7.

In addition, between a tag <FlowPlugin name="CurrentFile"> and a tag </FlowPlugin>, the data items 72 which define the information of the executing order by the processes described in A though C are formed.

That is, between a tag <FlowPlugin name="ColerConversion"> and a next tag </FlowPlugin>, data item 72a which defines the information of the executing conditions of the image process function defined by the process A described by using FIG. 7 is formed. In addition, before the data item 72a, data defined information of an object to be processed of the image process function is formed. The object to be processed of the image process function is data which are processed by the color converting plug-in program 41b; that is, data processed by the file selecting plug-in program 41a.

In FIG. 10, as the object to be processed by the color converting plug-in program 41b, a data name "InputImage" is shown, and as a plug-in program which outputs the data of "InputImage", "CurrentFile" is shown.

Between a tag <FlowPlugin name="Print"> and a next tag </FlowPlugin>, data in which information of an object to be processed by the output function set in the process B described by using FIG. 8 are formed. In FIG. 10, the object to be processed by the output function is data which are processed by the image printing plug-in program 41c; that is, data processed by the color converting plug-in program 41b.

In FIG. 10, as the object to be processed by the image printing plug-in program 41c, the data name "InputImage" to be processed by the image printing plug-in program 41c is shown, and as a plug-in program which outputs the data of "InputImage", "ColorConversion" is shown.

Between a tag <FlowPlugin name="Message BOx"> and a next tag </FlowPlugin>, a data item 72b in which information of the executing conditions of an information report function is defined based on a value set by the process C described by using FIG. 9 is formed. In FIG. 10, in the information report function, the data for defining information of the object to be processed are not formed. This signifies that the message displaying plug-in program 41d does not process data processed by another plug-in program.

The recipe data forming unit 42 temporarily stores the recipe data 21 formed as shown in FIG. 10 in the RAM of the main memory unit 12.

In the information processing apparatus 100, when a user selects "Execute Flow Test" 66 on the application window 61 shown in FIG. 9, it can be determined whether the desktop application software 20 processes the executing conditions, the executing order, and the object to be processed defined in the recipe data 21 temporarily stored in the RAM of the main memory unit 12. For example, when the executing order is set as the color converting plug-in program 41b is executed after executing the image printing plug-in program 41c, the executing order is wrong; therefore, for example, an error message is displayed.

When the controller 11 executes the application process software 23, the recipe data forming unit 42 forms the recipe data 21. With this, the information processing apparatus 100 can define information of operations such as the executing conditions and the executing order of the information processing unit 41 (plug-in programs) as data of a predetermined format for realizing a process which a user desires to execute.

Returning to FIG. 4, the recipe data storing unit 43 stores the recipe data 21 in a non-volatile memory unit, for example, the auxiliary memory unit 13.

When a user selects "Enter" 62e on the application window 61, the recipe data storing unit 43 stores the recipe data 21 temporarily stored in the main memory unit 12 in a predetermined region of the auxiliary memory unit 13. In addition, when the recipe data 21 are stored in the auxiliary memory unit 13, the recipe data storing unit 43 determines the recipe name (function name) to be the file name of the recipe data 21.

Figure 11:
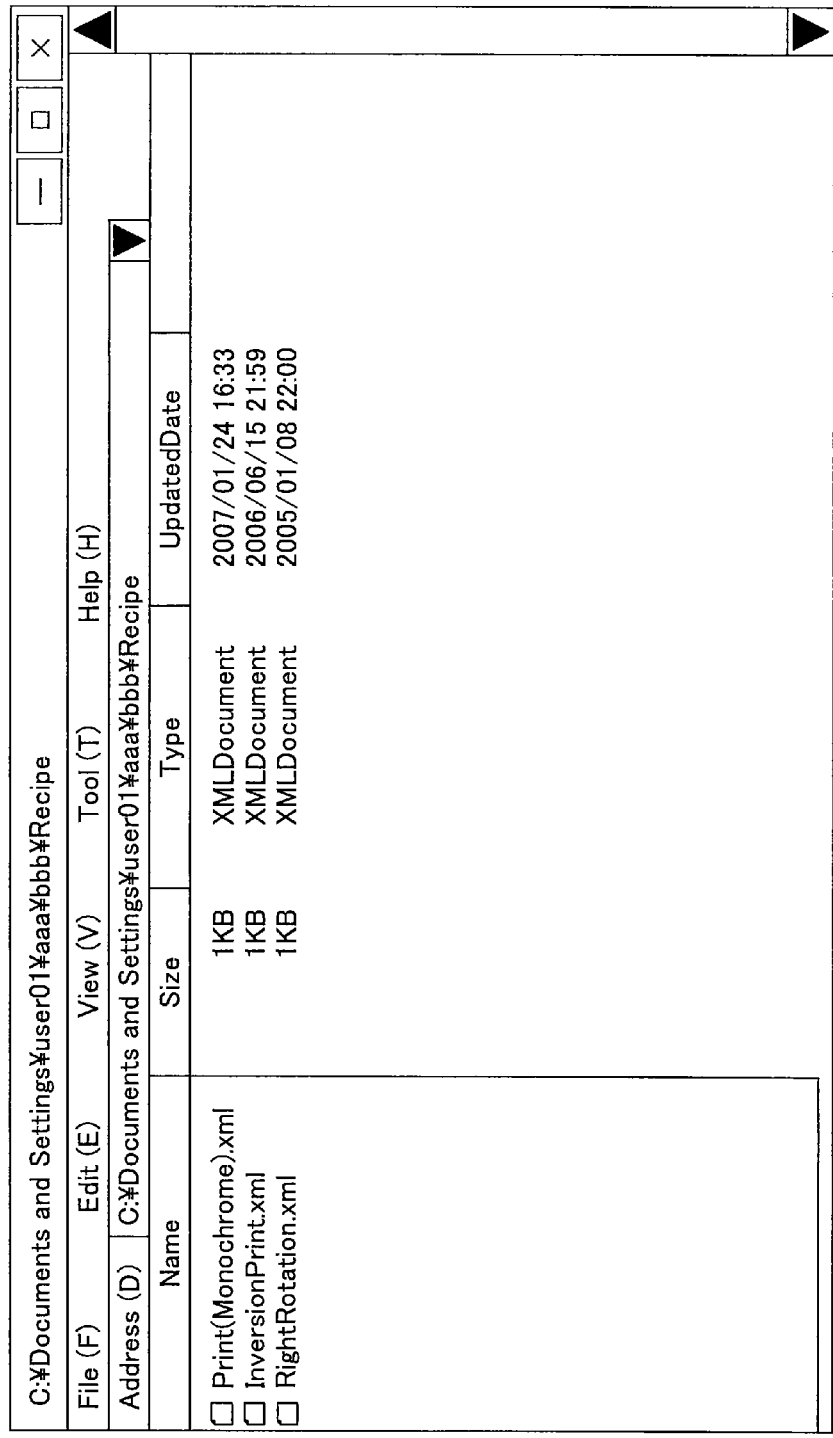
FIG. 11 is a diagram showing the recipe data which are stored in an auxiliary memory (secondary storage) unit shown in FIG. 2.

FIG. 11 is a diagram showing the recipe data 21 which are stored in the auxiliary memory unit 13.

The recipe data storing unit 43 designates a storing region in the auxiliary memory unit 13 and stores the recipe data 21 in the designated region, based on a storing address (folder path), for example, "C:¥Documents and Settings¥user01¥aaa¥bbb¥Recipe". That is, the predetermined region is a region in the auxiliary memory unit 13 designated by the storing address.

In FIG. 11, a list of the stored recipe data 21 is displayed on the browsing window 51 which manages files and folders of, for example, Explorer.

When the controller 11 executes the application process software 23, the recipe data storing unit 43 is realized.

As described above, in the information processing apparatus 100, when a function is added or changed in the desktop application software 20, the recipe data 21 are only changed corresponding to the intended purpose of the user. That is, when the user desires to change or add a function, the user can manage the function of the desktop application software 20 by only adding a function in the recipe data 21, editing the recipe data 21, or deleting a part of the recipe data 21 without changing a plug-in program or a main part of the desktop application software 20. In addition, when some recipe data 21 are deleted, the operations of the desktop application software are not influenced by the deletion.

Returning to FIG. 4, the menu item displaying unit 44 displays the recipe name (function name) of the recipe data 21 on the menu of the desktop application software 20 as one of the menu items based on the recipe data 21 stored by the recipe data storing unit 43.

The menu item displaying unit 44 displays the recipe name of the recipe data 21 at a predetermined region in a menu displaying region based on displaying position information defined in the recipe data 21.

Next, referring to FIGS. 12 through 16, the menu item displaying unit 44 is described in detail.

Figure 12:
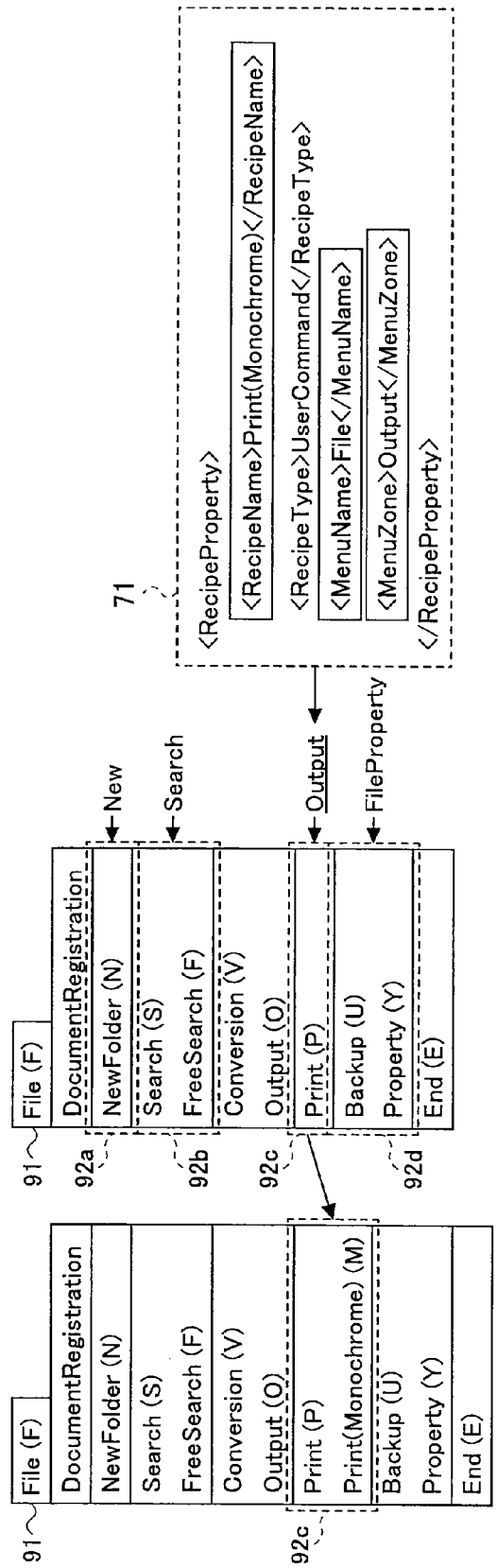
FIG. 12 is a diagram showing an example of a menu display corresponding to the recipe data.

FIG. 12 is a diagram showing an example of a menu display corresponding to the recipe data 21.

The desktop application software 20 provides plural menus 91, one menu 91 provides plural menu items 92, and the menu item displaying unit 44 determines on which menu item 92 of the menu 91 the recipe name is displayed.

The menu item displaying unit 44 specifies a menu 91 and specifies a menu item 92 of the specified menu on which the recipe name defined in the recipe data 21 is displayed.

In FIG. 12, a menu displaying example is shown. The example is based on the data items 71 in which the function information of the recipe data 21 is defined. In the data items 71, the recipe name (function name) is defined as "Print (Monochrome)", the menu name is defined as "File", and the menu zone is defined as "Output".

Therefore, the menu item displaying unit 44 specifies a menu "File" 91 from the plural menus 91 in the desktop application software 20 based on "File" of the menu name.

Next, the menu item displaying unit 44 determines a position where the recipe name is displayed in the displaying region of the specified menu 91.

Then the menu item displaying unit 44 determines a zone where the recipe name is displayed as the menu item 92 in the specified displaying region based on "Output" of the menu zone.

As shown in FIG. 12, the displaying region of the specified menu 91 "File" has plural menu item regions, for example, 92a, 92b, 92c, and 92d. The menu item region 92a corresponds to forming a new folder "New", the menu item region 92b corresponds to search "Search", the menu item region 92c corresponds to an output "Output", and the menu item region 92d corresponds to a file property "FileProperty".

In this case, the menu item displaying unit 44 determines the menu item region 92c corresponding to the menu zone "Output" as a region where the recipe name is displayed as the menu item in the plural menu item regions 92a through 92d based on "Output" of the menu zone.

Consequently, as shown in FIG. 12, the menu item displaying unit 44 displays the recipe name "Print (Monochrome)" in the menu item region 92c corresponding to the menu zone "Output" in the displaying region of the menu 91 "File".

As described above, the menu item displaying unit 44 displays the recipe name (function name) in the menu 91 of the desktop application software 20 based on the menu name and the menu zone defined in the recipe data 21. That is, the recipe name of the recipe data 21 is displayed at a predetermined position in the menu display region based on the displaying position information defined in the recipe data 21.

Figure 13:
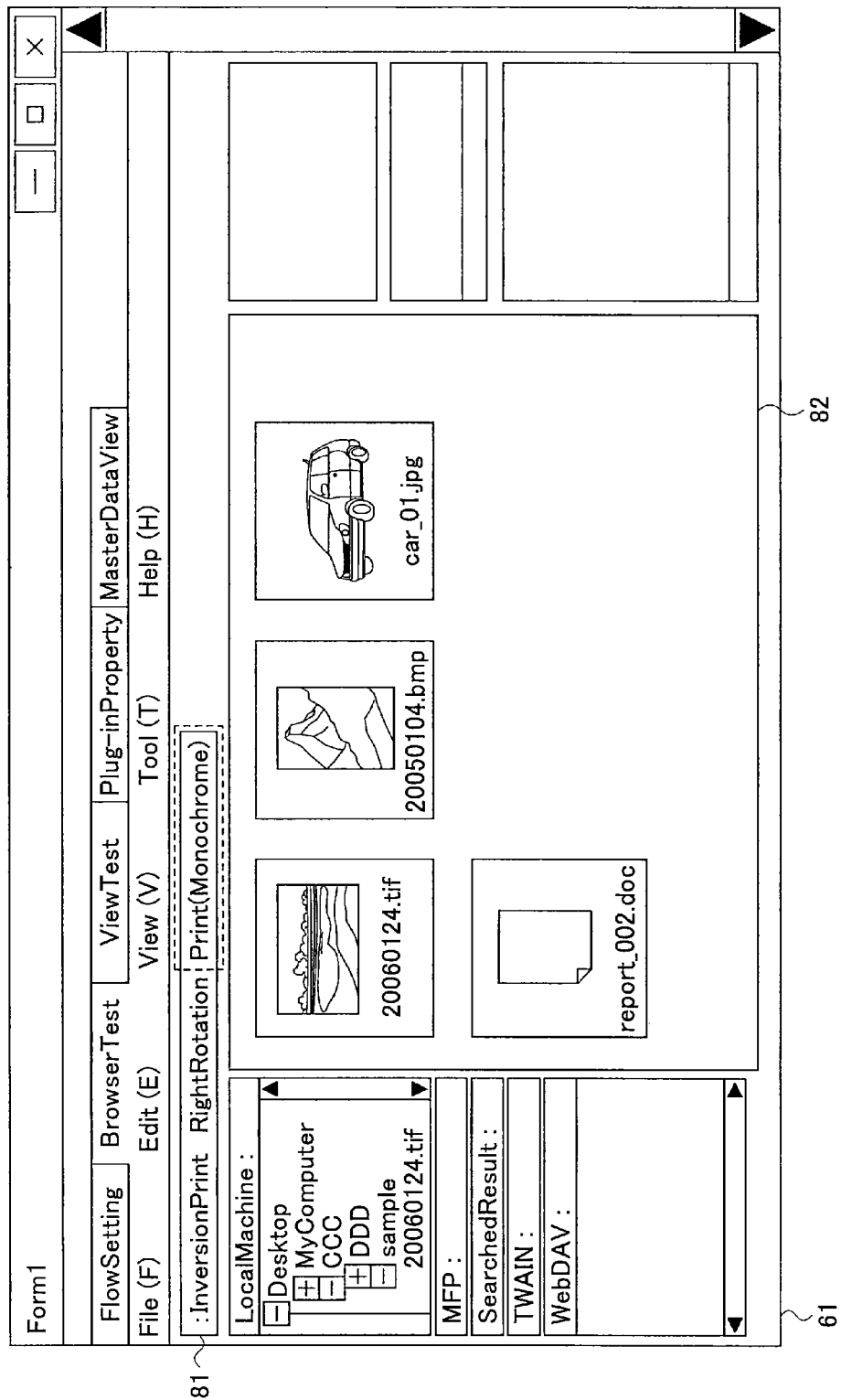
FIG. 13 is a diagram showing a first displaying screen when a new menu item is added.
Figure 14:
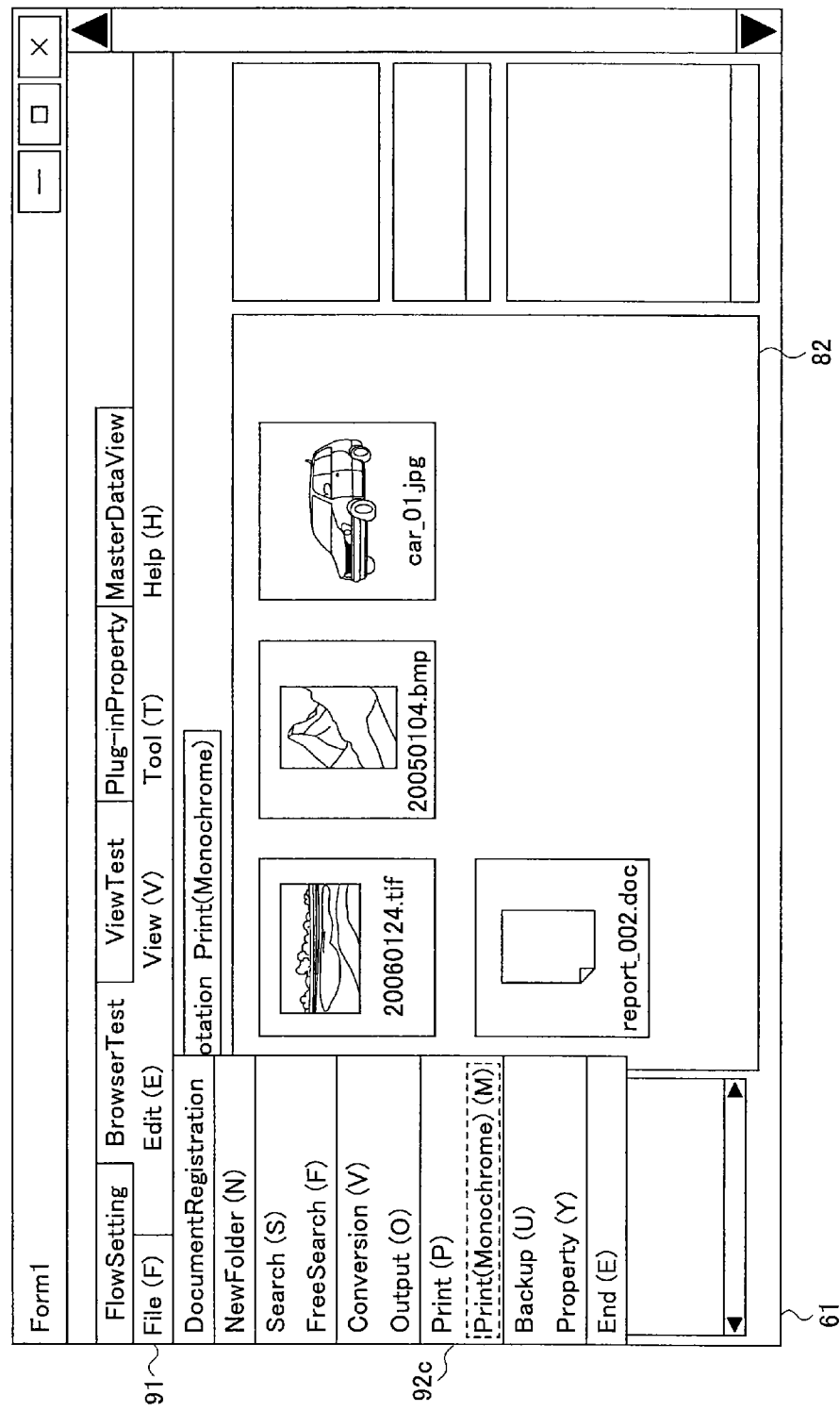
FIG. 14 is a diagram showing a second displaying screen when a new menu item is added.

FIG. 13 is a diagram showing a first displaying screen when a new menu item is added. FIG. 14 is a diagram showing a second displaying screen when a new menu item is added.

In FIG. 13, as a new menu item, the recipe name (function name) "Print (Monochrome)" is additionally displayed on a toolbar 81 of the application window 61. In addition, in FIG. 14, as a new menu item, the recipe name (function name) "Print (Monochrome)" is additionally displayed on the menu item region 92c of the menu 91 "File". In FIGS. 13 and 14, the additionally displayed part is shown by a frame of a dashed line.

Returning to FIG. 4, when the menu item displaying unit 44 displays the recipe name as the menu item 92, the menu item displaying unit 44 makes the recipe name to be displayed relate to the recipe data 21 in which the recipe name is defined.

Specifically, for example, a character string "Print (Monochrome)" of the recipe name to be displayed is made to be related to a character string, for example, "C:¥Documents and Settings¥user01¥aaa¥bbb¥Recipe¥Print (Monochrome).xml" (not shown) of a storing address (file path) of the recipe data 21 in which the recipe name is defined by data management of a table format.

Figure 15:
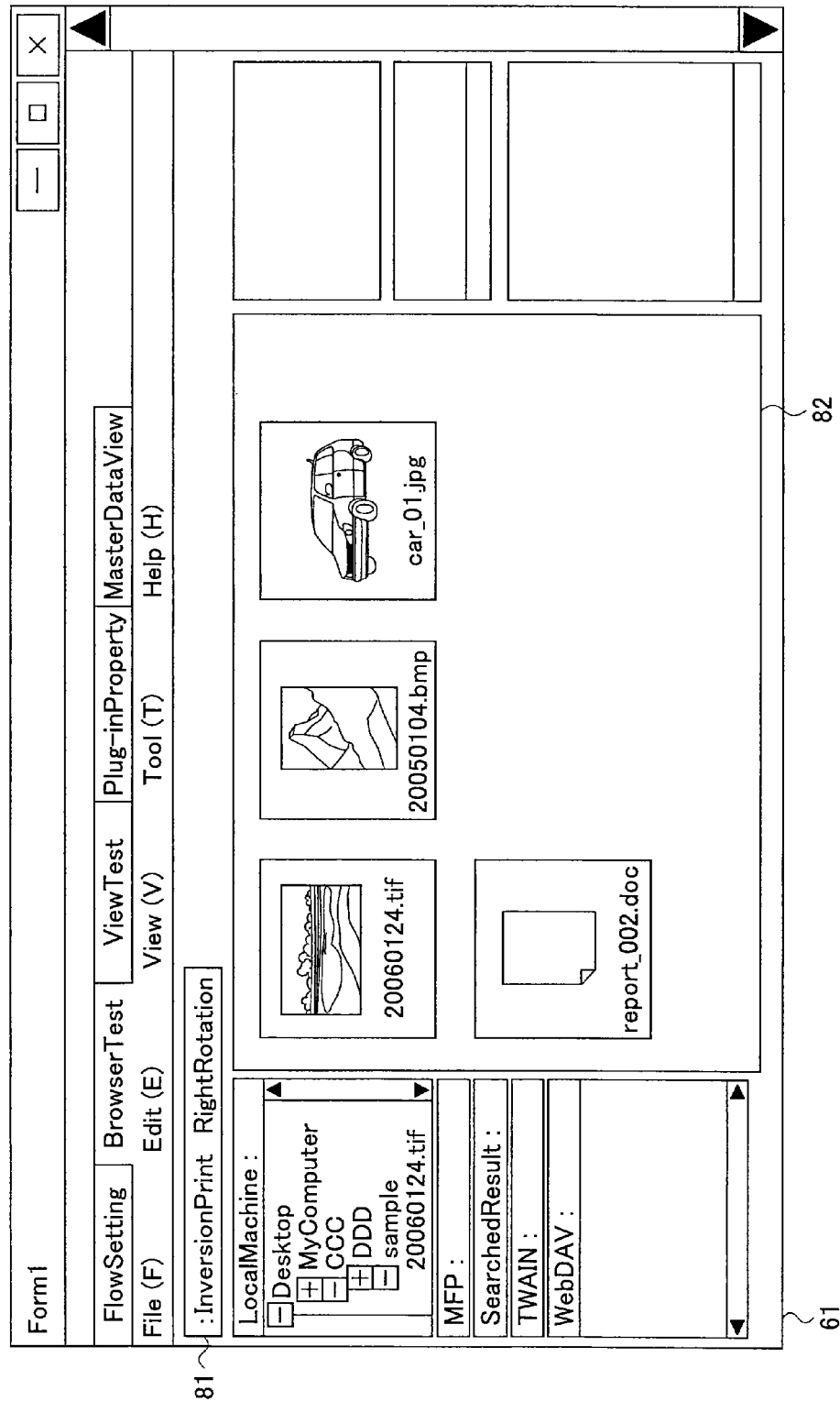
FIG. 15 is a diagram showing a first displaying screen when an added new menu item is deleted.
Figure 16:
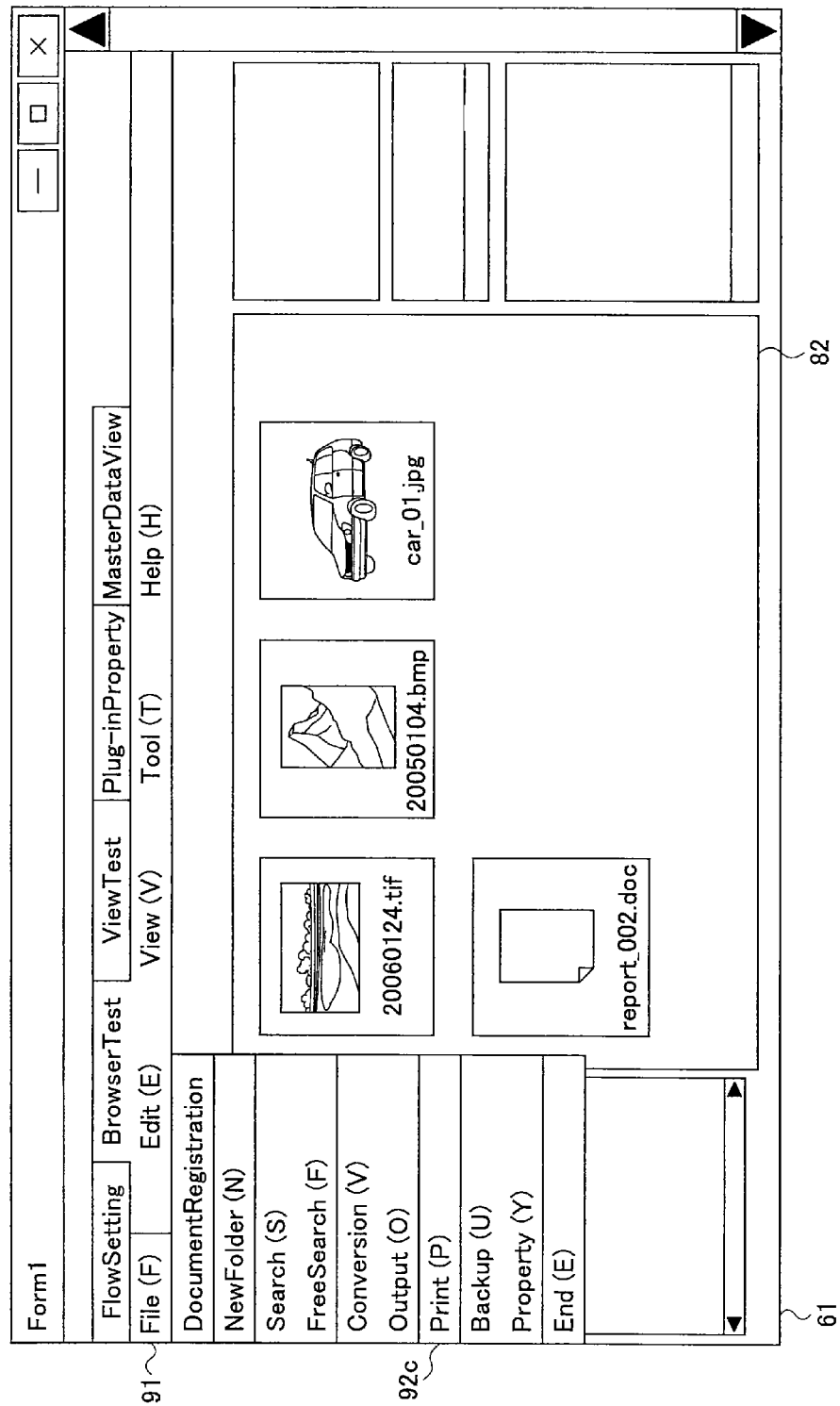
FIG. 16 is a diagram showing a second displaying screen when an added new menu item is deleted.

FIG. 15 is a diagram showing a first displaying screen when an added new menu item is deleted. FIG. 16 is a diagram showing a second displaying screen when an added new menu item is deleted.

In FIG. 15, the added recipe name (function name) "Print (Monochrome)" shown in FIG. 13 has been deleted from the toolbar 81 of the application window 61. In addition, in FIG. 16, the added recipe name (function name) "Print (Monochrome)" shown in FIG. 14 has been deleted from the menu item region 92c of the menu 91 "File".

As described above, the menu item displaying unit 44 controls whether the recipe name defined in the recipe data 21 is displayed, corresponding to whether the addition or the deletion of the data item of the recipe data 21 stored in a predetermined region of the non-volatile memory, for example, the auxiliary memory unit 13. When the controller 11 executes the application process software 23, the menu item displaying unit 44 is realized.

Returning to FIG. 4, the information process executing unit 45 executes the information processing unit 41 (plug-in programs) based on the recipe data 21.

When a user selects a recipe name displayed as a menu item by the menu item displaying unit 44 via the UI of the desktop application software 20, the information process executing unit 45 specifies one data item of the recipe data 21 in which the selected recipe name is defined from plural data items of the recipe data 21 stored in a non-volatile memory unit, for example, the auxiliary memory unit 13.

For example, the information process executing unit 45 receives a storing address (a character string of a file path) of one data item of the recipe date 21 corresponding to the displayed recipe name from the menu item displaying unit 44, and specifies one data item of the recipe data 21 from plural data item of the recipe data 21 stored in a non-volatile memory unit, for example, the auxiliary memory unit 13, based on the received storing address.

Next, the information process executing unit 45 parses the specified data item of the recipe data 21 by using a parser which can interpret a language of the recipe data 21 (for example, an XML parser in case of XML language).

Then the information process executing unit 45 instructs the information processing unit 41 to execute plug-in programs based on information of the executing conditions and the executing order of the plug-in programs which information is defined in the recipe data 21 necessary for realizing the function of the recipe data 21 and is obtained by the parsing. That is, the information process executing unit 45 loads the information processing unit 41 (plug-in programs) in the RAM of the main memory unit 12 from the auxiliary memory unit 13. When the controller 11 executes the core program 31 (refer to FIG. 3), the information process executing unit 45 is realized.

Therefore, when a user selects a function from the menu item 92, the information processing apparatus 100 can automatically execute the plug-in programs of the function plug-in software 30 based on the executing conditions and the executing order defined by the user.

The information processing apparatus 100 executes the above described units 41 through 45 by the following steps.

[Step 1: Settings of Information of Operations]

In the information processing apparatus 100, in order to realize a process by a user input via a UI of the desktop application software 20, information of operations such as the executing conditions and the executing order of the plug-in programs in the function plug-in software 30 (the information processing unit 41) is set.

Therefore, the information processing apparatus 100 obtains the function information, the information of the executing conditions and the executing order of the plug-in programs, and the information of the object to be processed. The function information is information which defines a process to be executed by the desktop application software 20 as one function. The information of the executing conditions and the executing order defines the executing conditions and the executing order of the plug-in programs (the information processing unit 41) for realizing the process to be executed by the desktop application software 20. The information of the object to be processed defines the object (data) to be processed by the plug-in programs (the information processing unit 41).

[Step 2: Forming of Recipe Data 21]

The recipe data forming unit 41 forms the recipe data 21 which defines the function information, the information of the executing conditions and the executing order, and the information of the object to be executed, corresponding to a predetermined format.

[Step 2-1: Forming of Data Items 71 which Define Function Information]

The information processing apparatus 100 forms the data items 71 which define the function information by inserting the corresponding tags of the recipe name, the recipe type, the menu name, and the menu zone with corresponding values (for example, a character string and/or a value) based on the set values of the function information between the tags defining the function information.

[Step 2-2: Forming of Data Items 72 which Define Executing Conditions, Executing Order, and Object to be Processed]

The information processing apparatus 100 forms the data items 72 which define the information of the executing conditions, the executing order, and the object to be processes, by inserting the name of the object to be processed of the information processing unit 41, the tags defining the object to be processed (the recipe start tag and the recipe completion tag), the condition value (control value, for example, a character string and/or a value), the tags (the recipe start tag and the recipe completion tag) which define the condition value (control parameter), between the tags which define the executing order, corresponding to the executing order, based on the set values of the information of the executing conditions and the executing order.

The recipe data storing unit 43 stores the recipe data 21 temporarily stored in the RAM of the main memory unit 12 in the non-volatile memory unit, for example, the auxiliary memory unit 13.

[Step 3: Execution of Recipe Data 21]

The information process executing unit 45 executes the information processing unit 41 (plug-in programs) based on the recipe data 21.

[Step 3-1: Specifying of Recipe Data 21]

When a user selects a recipe name displayed by the menu item displaying unit 44 as a menu item 92, the information processing apparatus 100 specifies one data item of the recipe data 21 in which the recipe name is defined from plural data items of the recipe data 21 stored in the non-volatile memory unit, for example, the auxiliary memory unit 13.

[Step 3-2: Parsing of Recipe Data 21]

The information processing apparatus 100 parses the specified data item of the recipe data 21 by using a parser (for example, XML parser) which can interpret the language of the recipe data 21.

[Step 3-3: Executing of Plug-in Program]

The information processing unit 100 instructs the information processing unit 41 to execute plug-in programs corresponding to the object to be processed, the executing conditions, and the executing order of the information processing unit 41 defined in the recipe data 21 based on the parsed result. That is, the information processing apparatus 100 loads the plug-in programs stored in the non-volatile memory unit, for example, the auxiliary memory unit 13 in the RAM of the main memory unit 12.

As described above, the information processing apparatus 100 can easily change a process to be executed by the desktop application software 20 by the steps 1 through 3, corresponding to the intended purpose of the user.

[Basic Processing Steps of Information Processing Apparatus 100]

Referring to FIGS. 17 through 20, basic processing steps of the information processing apparatus 100 are described.

In the information processing apparatus 100, an information processing program for executing processes of the desktop application software 20 stored in the auxiliary memory unit 13 is loaded in the RAM of the main memory unit 12, and the controller 11 executes the information processing program.

Figure 17:
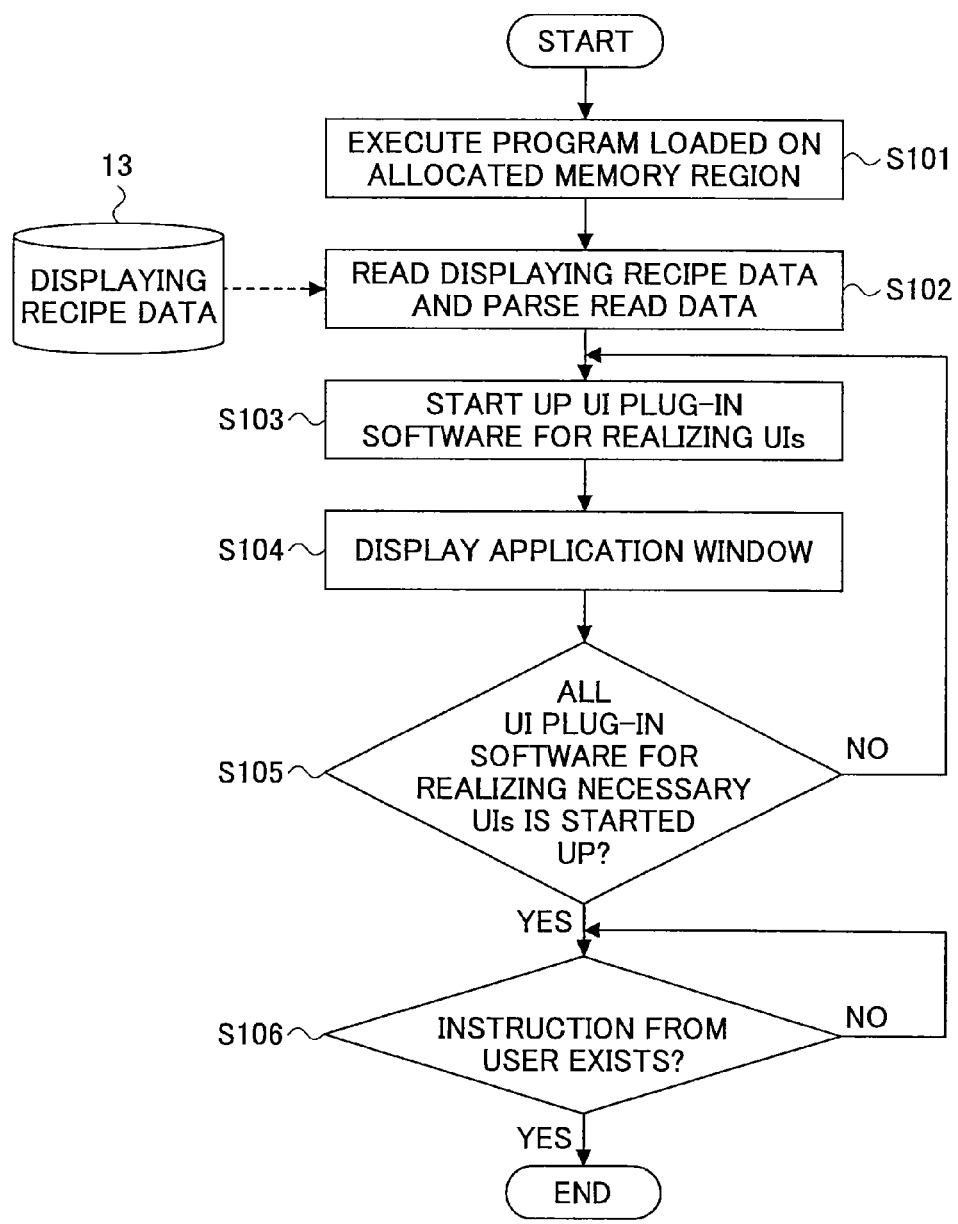
FIG. 17 is a flowchart showing processes when desktop application software shown in FIG. 3 is started up.

FIG. 17 is a flowchart showing processes when the desktop application software 20 is started up.

First, the information processing apparatus 100 receives a starting up instruction of the desktop application software 20 from a user. For example, the user clicks an icon linked to a program (for example, DesktopApprRun.exe) for executing the application process software 23 in the desktop application software 20 by using a mouse which icon is displayed on a screen of a display device of the information processing apparatus 100. With this, the information processing apparatus 100 loads a program and related data of the desktop application software 20 in a memory region allocated by the OS in the RAM of the main memory unit 12, and the controller 11 executes the program (S101).

The information processing apparatus 100 reads displaying recipe data which define UIs necessary for forming the application window 61 from the auxiliary memory unit 13 by using the started up application process software 23. The displaying recipe data have been stored beforehand in a non-volatile memory unit, for example, the auxiliary memory unit 13. Then the information processing apparatus 100 parses the read displaying recipe data by starting up a parser from the application process software 23 which parser can interpret a language by which the displaying recipe data are described (S102).

The information processing apparatus 100 starts up the UI plug-in software 22 for realizing the necessary UIs based on the parsed result of the displaying recipe data in which the UIs are defined (S103).

The information processing apparatus 100 displays the application window 61 on an output device such as a CRT or a LCD by using the application process software 23 (S104).

The information processing apparatus 100 determines whether all the UI plug-in software 22 for realizing the necessary UIs is started up (S105).

When all the UI plug-in software 22 for realizing the necessary UIs is started up (YES in S105), the information processing apparatus 100 ends the starting up process of the desktop application software 20, and waits for an instruction from the user via a UI (S106).

When all the UI plug-in software 22 for realizing the necessary UIs is not started up (NO in S105), the process returns to S103.

As described above, the information processing apparatus 100 starts up the desktop application software 20 by the processes from S101 through S106.

Figure 18:
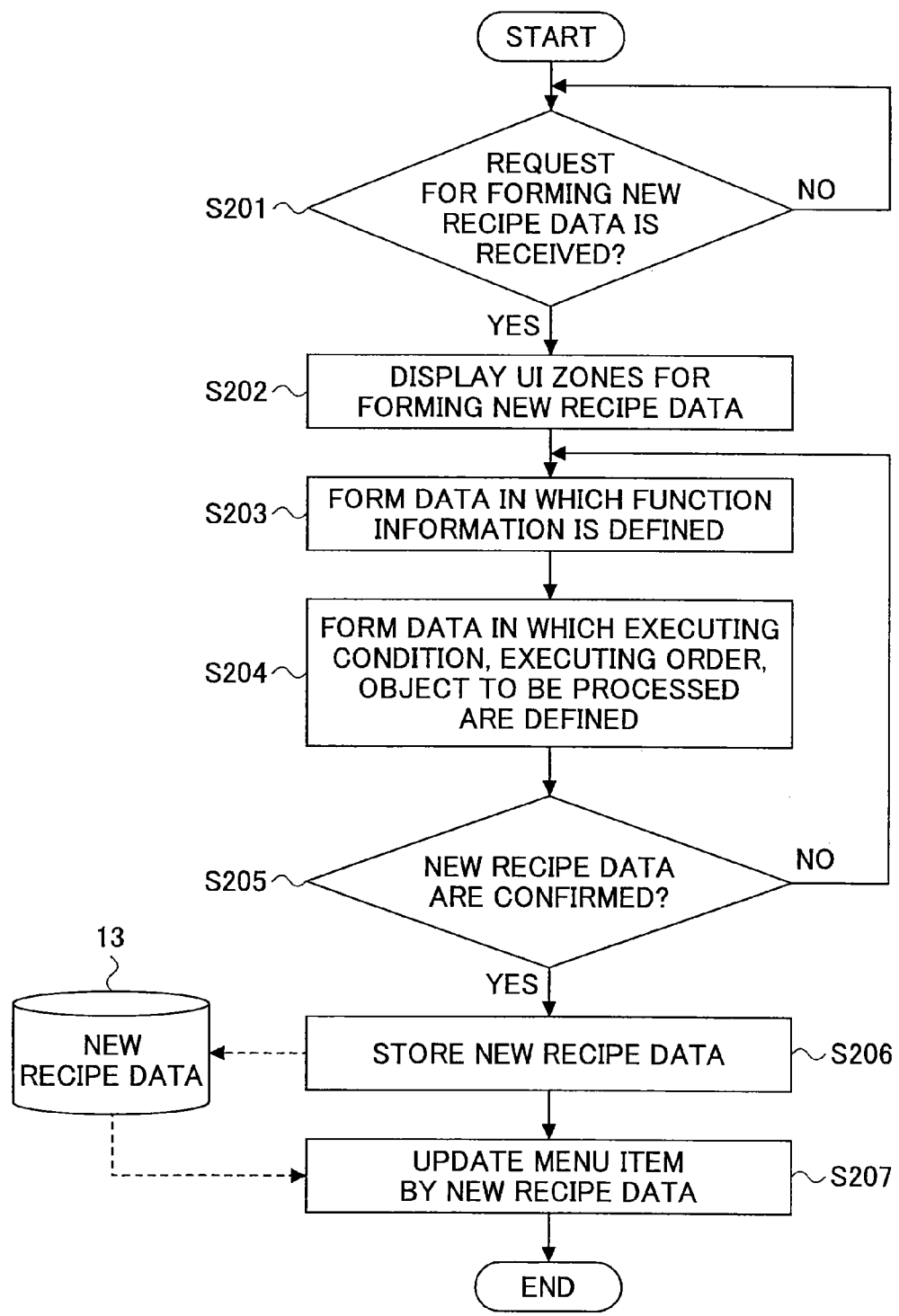
FIG. 18 is a flowchart showing processes when the desktop application software forms the recipe data.

FIG. 18 is a flowchart showing processes when the desktop application software 20 forms the recipe data 21.

The processes shown in FIG. 18 are executed during the process of S106 shown in FIG. 17; that is, during the process waiting for the instruction from the user.

The information processing apparatus 100 waits for a request for forming new recipe data 21 from the user by having selected "Flow Setting" shown in FIG. 7 by using a mouse (S201).

When the information processing apparatus 100 receives a request for forming new recipe data 21 from the user (YES in S201), the information processing apparatus 100 executes the UI plug-in software 22 for forming setting UI zones such as the function information setting zone 62, the plug-in program selecting zone 63, the executing order setting zone 64, and the executing condition setting zone 65, and displays the zones 62 through 65 on the screen of the display device of the information processing apparatus 100 for forming the new recipe data 21 (S202). On the function information setting zone 62, the function information is set as a UI zone; that is, the function information is set as one function of the desktop application software 20 for a process which the user desires to execute. On the plug-in program selecting zone 63, plug-in programs are selected for realizing the process which the user desires to execute. On executing order setting zone 64, the executing order of the plug-in programs is set. On the executing condition setting zone 65, the executing conditions of the plug-in programs are set.

The information processing apparatus 100 forms the data items 71 in which the function information in the new recipe data 21 is defined by the application process software 23, which receives the request for forming the new recipe data 21. The application process software 23 forms the data items 71 in which the function information is defined by inserting the corresponding tags of the recipe name, the recipe type, the menu name, and the menu zone with corresponding values (for example, a character string and/or a value) based on the set values of the function information, between the tags which define the function information (S203).

Next, the application process software 23 forms the data items 72 in which the information of the executing conditions and the executing order of the plug-in programs and the information of the object to be processed are defined. The application process software 23 forms the data items 72, by inserting the name of the object to be processed of the information processing unit 41, the tags defining the object to be processed (the recipe start tag and the recipe completion tag), the condition value (control value, for example, a character string and/or a value), the tags (the recipe start tag and the recipe completion tag) which define the condition values (control parameters) between the tags which define the executing order, based on the executing order and the set values of the information of the executing conditions, then the above process is repeated by the number of the plug-in programs which are required to execute the object (S204).

The application process software 23 forms the new recipe data 21 based on the data items 71 in which the function information is defined and the data items 72 in which the information of the executing conditions, the executing order, and the object to be processed is defined. Then the information processing apparatus 100 stores the new recipe data 21 in the RAM of the main memory unit 12.

The information processing apparatus 100 waits for an instruction from the user which instruction confirms the contents of the new recipe data 21 (S205). For example, when the user clicks "Enter" 62e on the function information setting zone 62 shown in FIG. 9 by using the mouse, the contents of the new recipe data 21 are confirmed.

When an instruction from the user which instruction confirms the contents of the new recipe data 21 is received (YES in S205), the application process software 23 stores the new recipe data 21 temporarily stored in the RAM of the main memory unit 12 in the non-volatile memory unit, for example, the auxiliary memory unit 13 (S206).

For example, when "Browsing Test" shown in FIG. 9 is selected by using the mouse, the information processing apparatus 100 updates the menu item with the application process software 23 at a timing when the application window 61 is displayed again, based on the new recipe data 21 stored in the non-volatile memory unit, for example, the auxiliary memory unit 13 (S207). The application process software 23 determines the menu zone where the recipe name is displayed in the menu 91 based on the menu name and the displaying position information of the menu zone defined in the new recipe data 21, and displays the recipe name at the determined menu zone.

Figure 19:
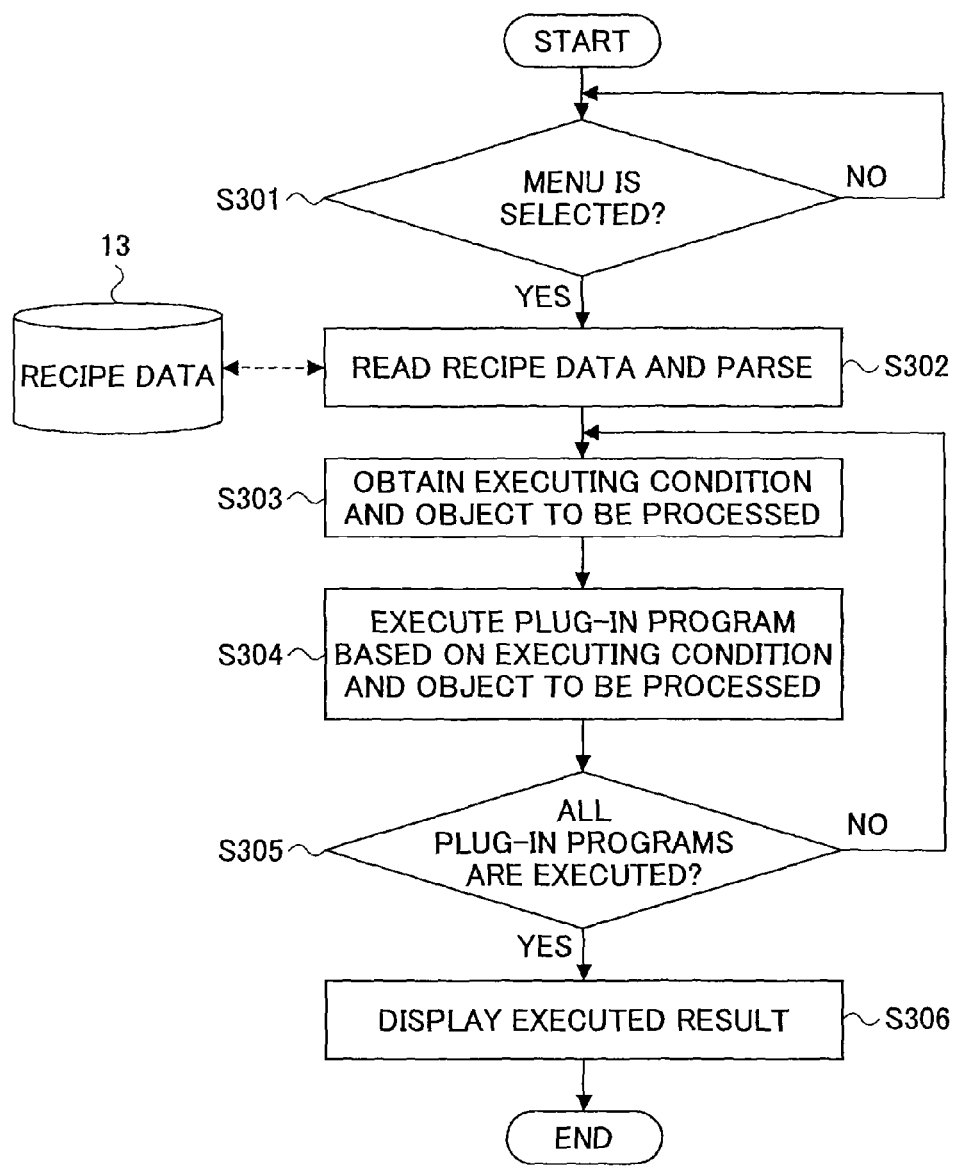
FIG. 19 is a flowchart showing processes when the desktop application software executes a function.

Since the application window 61 has been changed to the UI display which executes the function from the UI display which forms the new recipe data by the selection of "Browsing Test", the processes are shifted to processes shown in FIG. 19.

As described above, the information processing apparatus 100 forms the new recipe data 21 by executing the processes S201 through S207 shown in FIG. 18.

FIG. 19 is a flowchart showing processes when the desktop application software 20 executes a function.

The processes shown in FIG. 19 are executed during the process of S106 shown in FIG. 17; that is, during the process waiting for the instruction from the user.

First, the information processing apparatus 100 waits for an instruction from a user, for example, an instruction to select a menu (S301).

When the information processing apparatus 100 receives an instruction from a user (YES in S301), the application process software 23 sends the instruction received via a UI to the core program 31 via a data I/F, the core program 31 reads recipe data 21 corresponding to a recipe name of a menu item 92 from a non-volatile memory unit, for example, the auxiliary memory unit 13, and parses the read recipe data 21 by starting up a parser which can interpret a language of the recipe data 21 from the core program (S302).

The core program 31 obtains a name of an object to be processed by a plug-in program and the executing conditions of the plug-in program for realizing a process defined in the recipe data 21 (S303).

The core program 31 instructs the plug-in program of the function plug-in software 30 to execute the plug-in program based on the obtained executing conditions and the name of the object to be processed (S304).

The information processing apparatus 100 determines whether all plug-in programs are executed for realizing the instruction from the user (S305).

When all plug-in programs are executed for realizing the instruction from the user (YES in S305), the information processing apparatus 100 displays the executed result on a display device (S306). For example, a message for reporting the executed result is displayed on a window different from the application window 61. After displaying the executed result, the information processing apparatus 100 waits for a next instruction from the user.

When all plug-in programs for realizing the user instruction are not executed (NO in S305), the process returns to the process in S303.

As described above, the information processing apparatus 100 executes the plug-in programs of the function plug-in software 31 by the processes S301 through S306.

Figure 20:
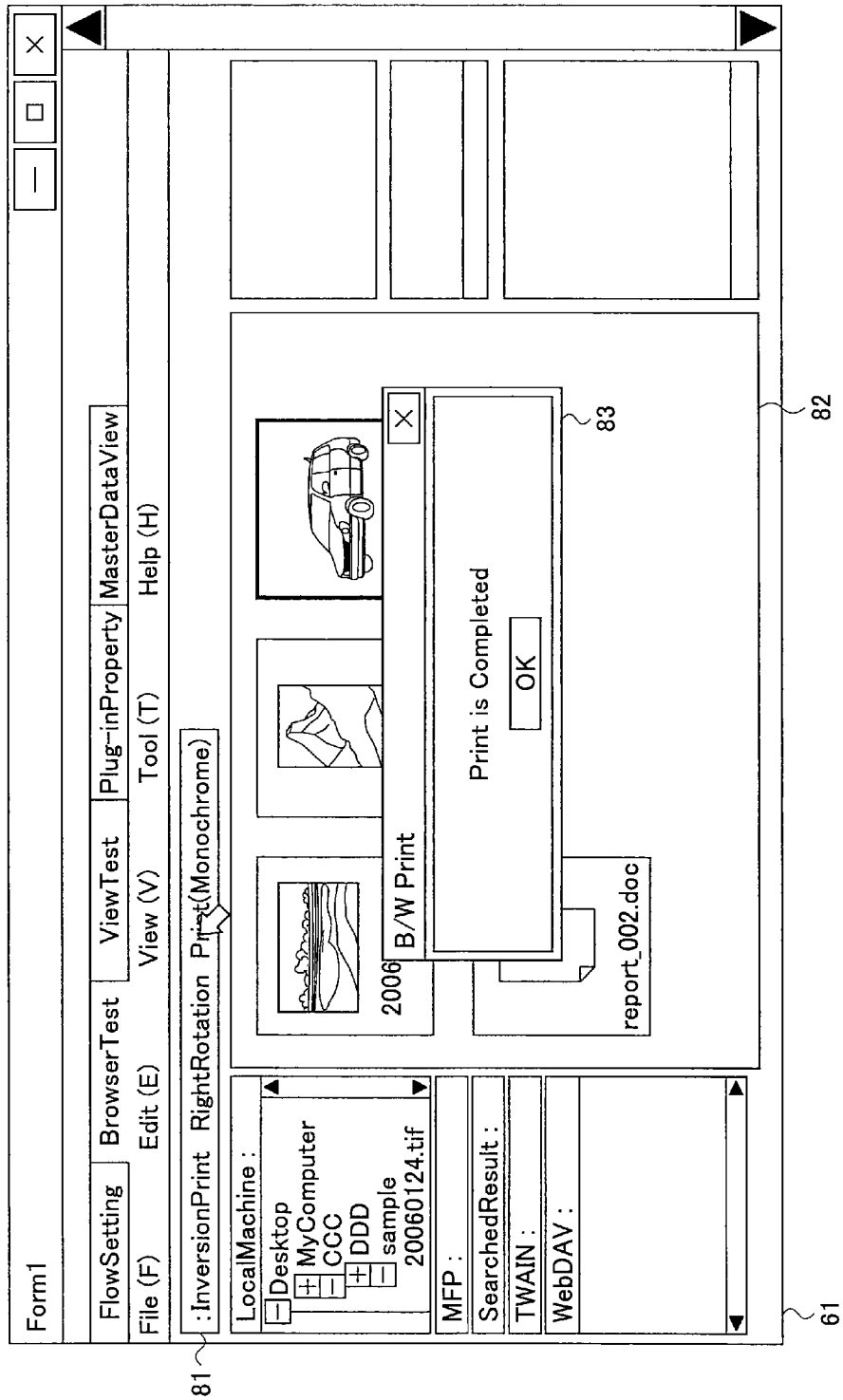
FIG. 20 is a diagram showing a displaying screen when a monochrome printing function is executed.

FIG. 20 is a diagram showing a displaying screen when a monochrome printing function is executed.

As described in FIGS. 7 through 10, when the process "input image data are printed by having color conversion applied" is executed, the information processing apparatus 100 executes the processes shown in FIGS. 17 through 19 by the controller 11. With this, the executed result is displayed on the displaying screen shown in FIG. 20.

In FIG. 20, the menu item "Print (Monochrome)" displayed on the toolbar 81 is clicked by a mouse, and the monochrome printing is executed based on the recipe data 21 shown in FIG. 10. Then the message displaying plug-in program 41*d* displays a message "Print is completed" for reporting the completion of the monochrome print set by the executing conditions on a message window 83 different from the application window 61.

As described above, the desktop application software 20 executes the programs in which the processes shown in FIGS. 17 through 20 are coded by using a suitable language by the operations of the controller 11. That is, the information processing apparatus 100 executes the information processing program, and the information processing program can be stored in a computer-readable recording medium.

[Function Definition by User]

In the above description, as an example, the process "input image data are printed by having color conversion applied" is described as the monochrome print function of the desktop application software 20. However, the function is not limited to the monochrome print function.

Next, referring to FIG. 21 through 26, an image inverting print function and an image rotating display function defined by a user are described.

[Image Inverting Print Function]

In the image inverting print function, image data are inverted and the inverted image data are printed. The image inverting print function is defined by a user as one of functions of the desktop application software 20.

Figure 21:
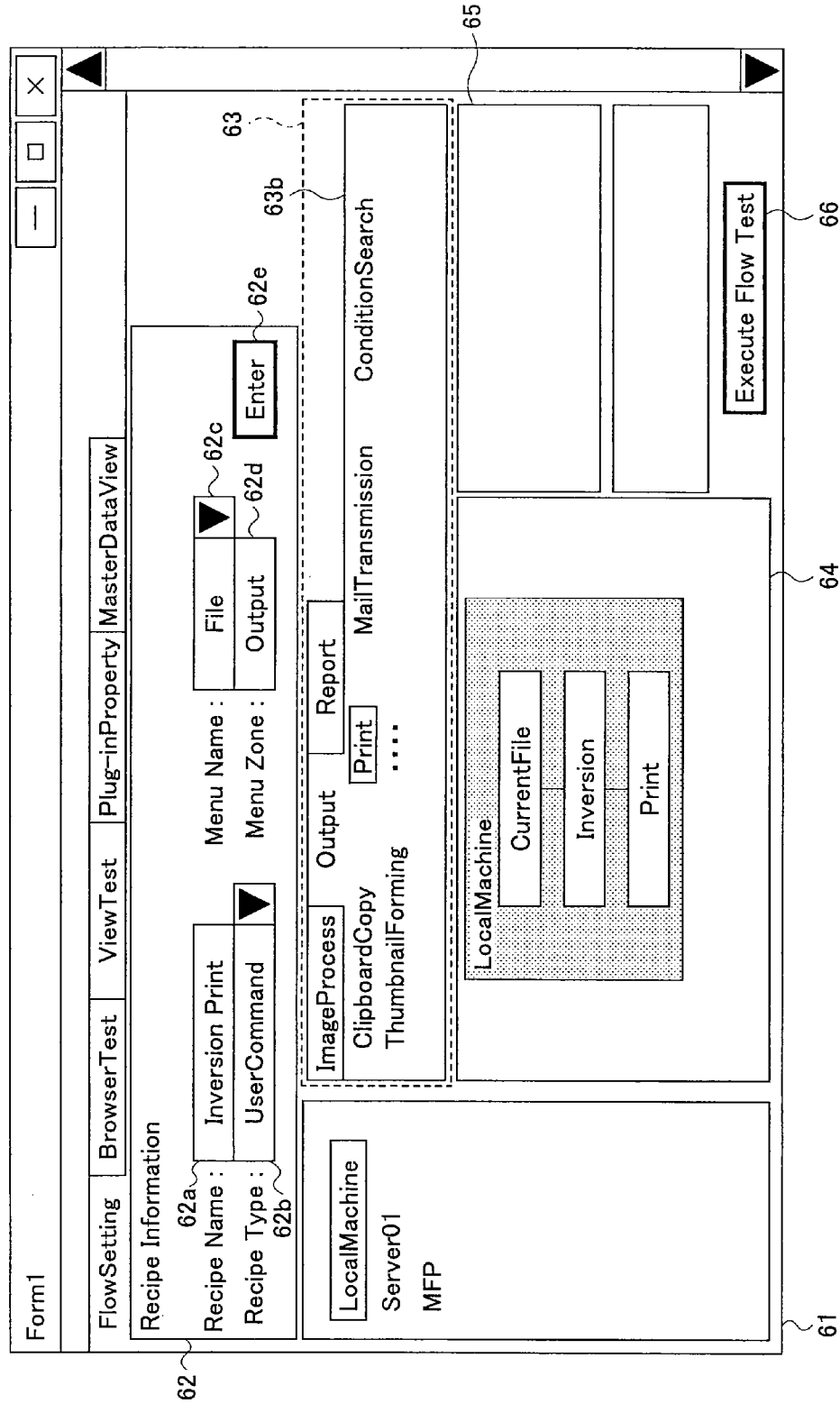
FIG. 21 is a diagram showing a displaying screen when recipe data of an image inverting print function are formed.

FIG. 21 is a diagram showing a displaying screen when recipe data 21 of the image inverting print function are formed.

A user sets function information on the function information setting zone 62 of the application window 61 so that the process is defined in which process the image data are inverted and the inverted image data are printed as the image inverting print function of the desktop application software 20. In addition, in order to realize the image inverting print function by using plug-in programs selected at the plug-in program selecting zone 63, the user sets the executing order of the plug-in programs at the executing order setting zone 64. That is, the user drags "CurrentFile", "Inversion", and "Print" in this order and drops them at the executing order setting zone 64. In FIG. 21, since "CurrentFile" and "Inversion" are in "Image Process" of the plug-in program selecting zone 63, "Current File" and "Inversion" are not shown.

With this, the information processing apparatus 100 obtains the information of the image inverting print function and the executing order of the plug-in programs of the function plug-in software 30.

FIG. 22 is a diagram showing recipe data 21 in the image inverting print function.

As shown in FIG. 22, the recipe data forming unit 42 forms recipe data 21 including the data items 71 in which the function information is defined and the data items 72 in which the information of the executing order of the plug-in programs and the object to be processed are defined, based on the processes set by the image inverting print function shown in FIG. 21. The recipe data storing unit 43 stores the recipe data 21 in a non-volatile memory unit, for example, the auxiliary memory unit 13.

FIG. 23 is a diagram showing a displaying screen when the image inverting print function is executed.

In FIG. 23, the menu item "InversionPrint" displayed on the toolbar 81 is clicked by a mouse, the information process executing unit 45 reads the recipe data 21 of the image inverting print function from a non-volatile memory unit, for example, the auxiliary memory unit 13, and executes the plug-in programs for realizing the image inverting print function based on the executing order in the recipe data 21.

Consequently, as shown in FIG. 23, an inverted image is displayed.

In FIG. 23, an image inverting process is applied to image data "car_01.jpg" selected by a user, and the image inverted result is displayed on an executed result displaying window 84 for confirming a print result of the inverted image data.

[Image Rotating Display Function]

In the image rotating display function, for example, image data are rotated by 90 degrees in the right direction. The image rotating display function is defined by a user as one of functions of the desktop application software 20.

Figure 24:
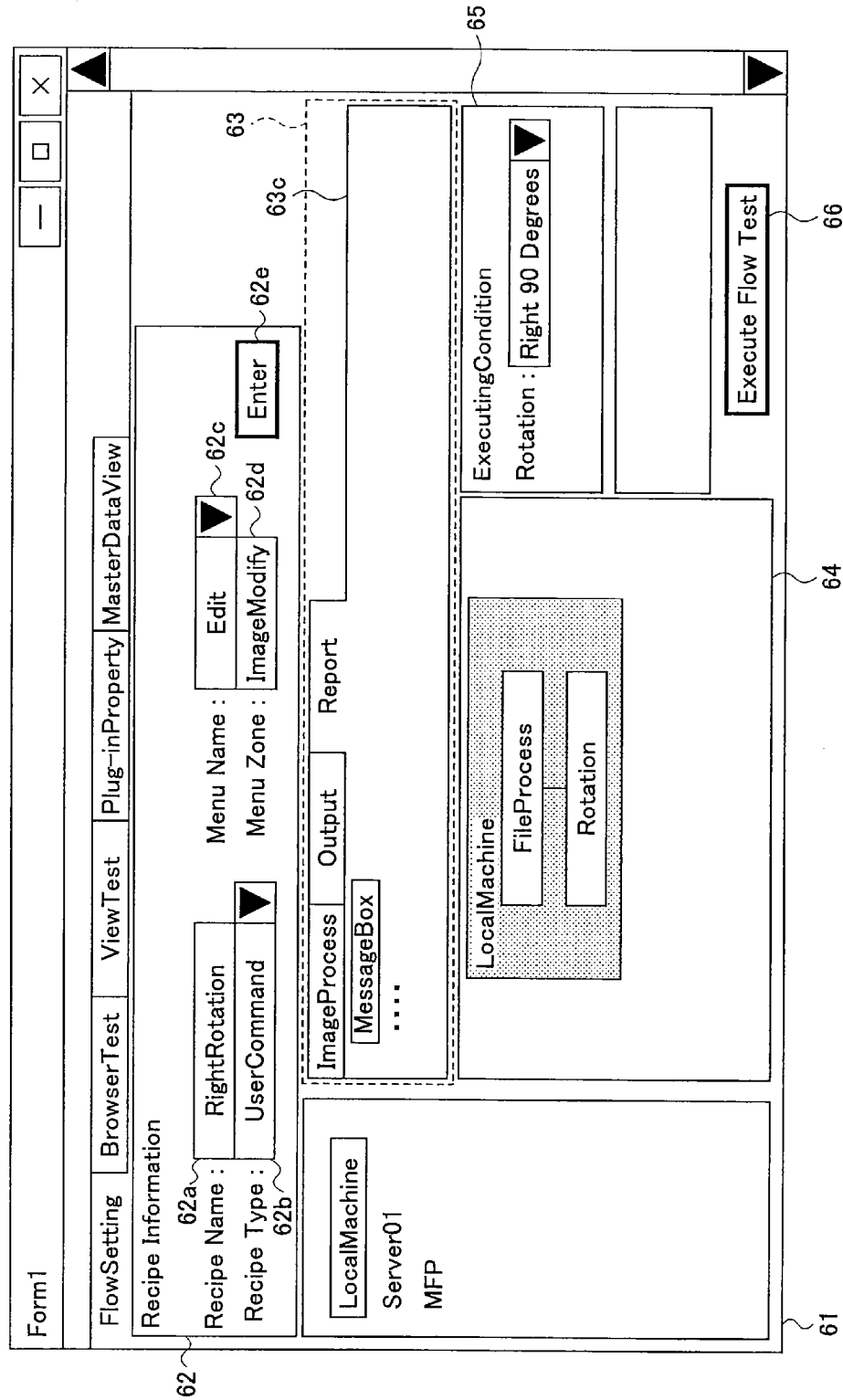
FIG. 24 is a diagram showing a displaying screen when recipe data of an image rotating display function are formed.

FIG. 24 is a diagram showing a displaying screen when recipe data of the image rotating display function are formed.

A user sets function information on the function information setting zone 62 of the application window 61 so that the process is defined in which process the image data are rotated by 90 degrees in the right direction as the image rotating display function of the desktop application software 20. In addition, in order to realize the image rotating display function by plug-in programs which are selected at the plug-in program selecting zone 63, the user sets the executing order of the plug-in programs of the function plug-in software 30. That is, the user drags "FileProcess" and "Rotation" in this order and drops them at the executing order setting zone 64. In this case, since the image data are rotated by 90 degrees in the right direction, in the executing condition setting zone 65, the control value of "Right 90 Degrees" is set. In FIG. 24, since "FileProcess" and "Rotation" are in "ImageProcess" of the plug-in program selecting zone 63, "FileProcess" and "Rotation" are not shown.

With this, the information processing apparatus 100 obtains the information of the image rotating function and the executing order of the plug-in programs and the executing conditions of the plug-in programs of the function plug-in software 30.

Figure 25:
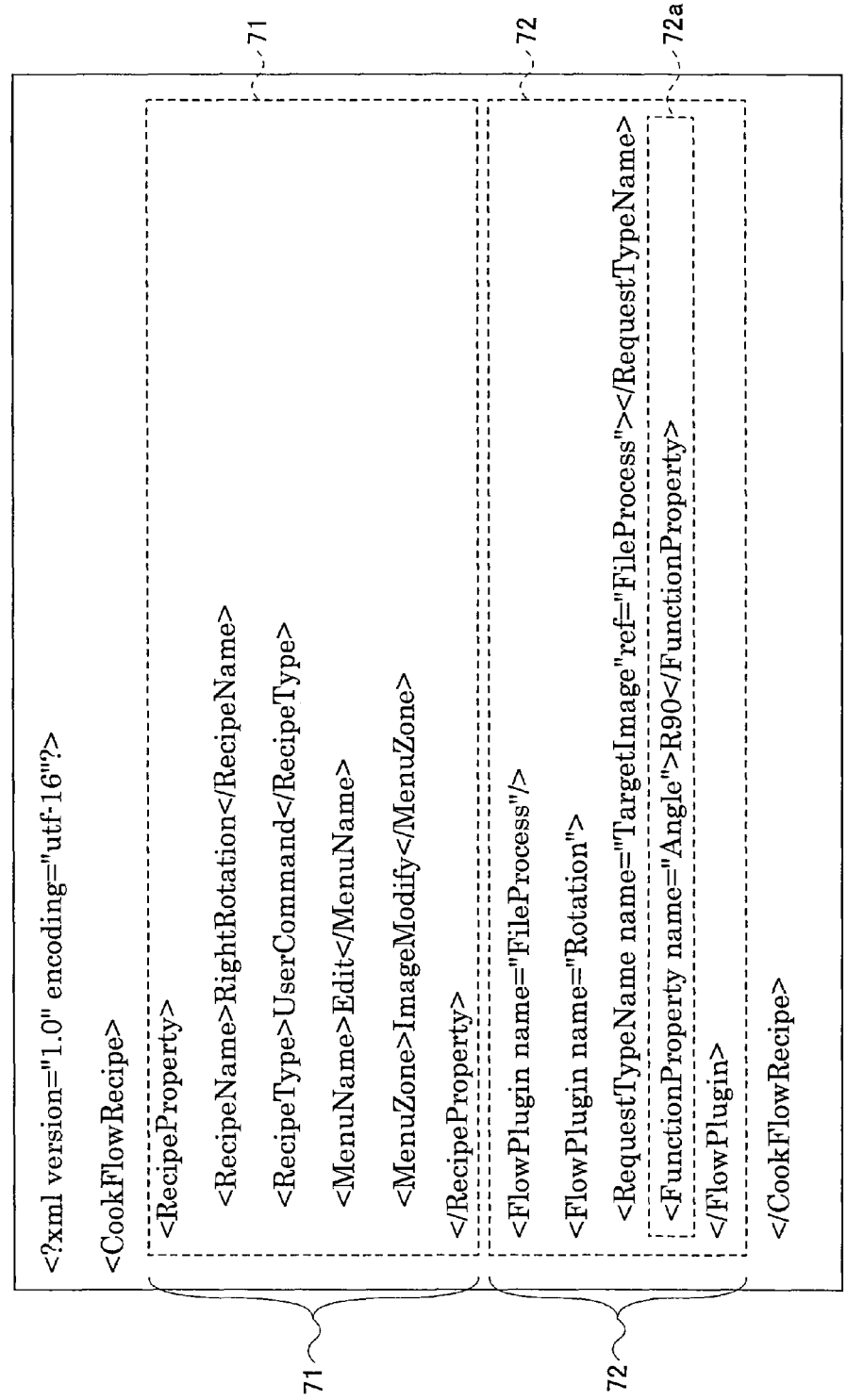
FIG. 25 is a diagram showing recipe data in the image rotating display function.

FIG. 25 is a diagram showing recipe data 21 in the image rotating display function.

As shown in FIG. 25, the recipe data forming unit 42 forms recipe data 21 including the data items 71 in which the function information is defined and the data items 72 in which the information of the executing order and the executing conditions of the plug-in programs and the object to be processed are defined, based on the processes set by the image rotating display function shown in FIG. 24. The recipe data storing unit 43 stores the recipe data 21 in a non-volatile memory unit, for example, the auxiliary memory unit 13.

Figure 26:
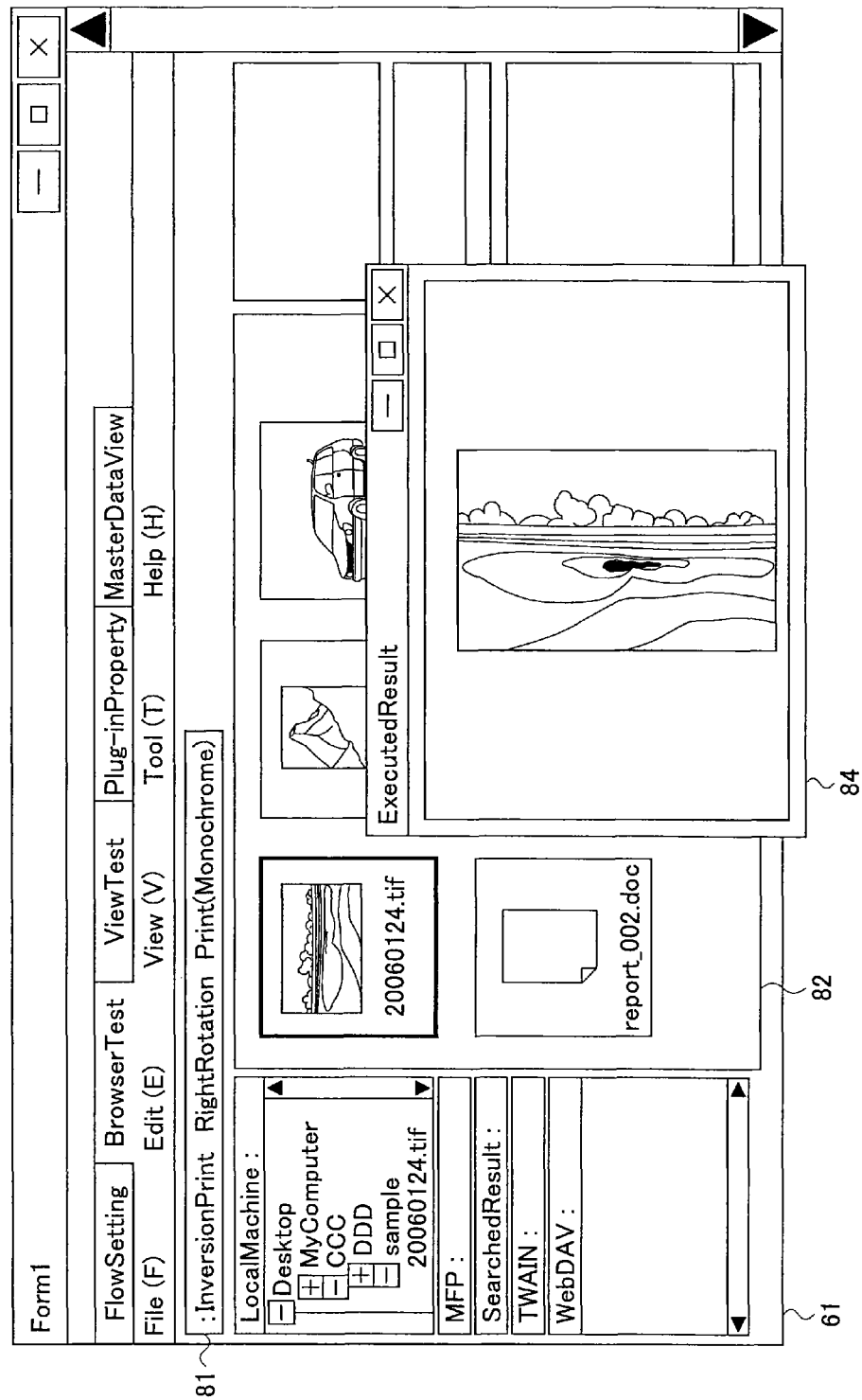
FIG. 26 is a diagram showing a displaying screen when the image rotating display function is executed.

FIG. 26 is a diagram showing a displaying screen when the image rotating display function is executed.

In FIG. 26, the menu item "RightRotation" displayed on the toolbar 81 is clicked by a mouse, the information process executing unit 45 reads the recipe data 21 of the image rotating display function from a non-volatile memory unit, for example, the auxiliary memory unit 13, and executes the plug-in programs for realizing the image rotating display function based on the executing order and the executing conditions in the recipe data 21.

Consequently, as shown in FIG. 26, a rotated image is displayed.

In FIG. 26, an image rotating display process is applied to image data "20060124.tif" selected by a user, and the image rotated result is displayed on the executed result displaying window 84 for confirming rotated image data.

As described above, according to the embodiment of the present invention, in the information processing apparatus 100, the processes to be executed by the desktop application software 20 can be easily changed based on a change of the intended purpose of a user.

In the embodiment of the present invention, the recipe data 21 can be formed by another method in which recipe data 21 are edited by using editing software in the information processing apparatus 100 based on an editing standard which describes the recipe data 21.

In addition, the information reporting function can be displayed by a popup window of the toolbar 81.

Further, the present invention is not limited to the specifically disclosed embodiment, and variations and modifications may be made without departing from the scope of the present invention.

The present invention is based on Japanese Priority Patent Application No. 2007-071600, filed on Mar. 19, 2007, with the Japanese Patent Office, the entire contents of which are hereby incorporated herein by reference.

What is claimed is:

1. An information processing apparatus, comprising:
a user interface which displays a first zone for receiving an input operation of a selection of a plug-in to execute a function to generate recipe data and a second zone for displaying an executing order of a plurality of functions corresponding to the selected plug-in; and
an information processor which
generates the recipe data according to the input operation, the recipe data including an executing condition, the executing order and specific tags that define a start and an end of the execution order;
stores the recipe data in a memory; and
executes a predetermined process by executing the plurality of functions based on the recipe data, wherein
the user interface displays a data generation window including a third zone for setting the executing condition corresponding to the function when the executing condition can be set for the function, and the input operation is performed in the data generation window displayed by the user interface.

2. The information processing apparatus as claimed in claim 1, wherein
the user interface displays a menu display window for displaying menu items corresponding to the recipe data, and
the menu display window enables addition and/or deletion of a menu item in the menu display window.

3. The information processing apparatus as claimed in claim 2, wherein the recipe data generated in the data generation window defines displaying position information for displaying in the menu display window.

4. The information processing apparatus as claimed in claim 1, wherein the information processor defines the executing order of the functions based on the selected executing order, defines the executing condition based on a value input by a user corresponding to a selected information processor, and generates the recipe data.

5. The information processing apparatus as claimed in claim 1, wherein the plurality of functions include:
an image processing function which applies a predetermined process to image data input to the information processing apparatus;
a data outputting function which outputs the input image data or data processed by the image processing function; and
an information reporting function which reports an executing status and an executed result when the image processing function and/or the data outputting function is executed.

6. The information processing apparatus as claimed in claim 1, wherein the plurality of functions are inverting or rotating functions.

7. The information processing apparatus as claimed in claim 1, wherein the information processor reads the recipe data from the memory, and executes the plurality of functions according to the executing condition and the executing order defined by the recipe data.

8. An information processing method, comprising:
displaying, by processing circuitry of an information processing apparatus, a user interface including a first zone for receiving an input operation a selection of a plug-in to execute a function to generate recipe data and a second zone for displaying an executing order of a plurality of functions corresponding to the selected plug-in;
generating, by the processing circuitry, the recipe data including according to the input operation, the recipe data including an executing condition, the executing order and specific tags that define a start and an end of the execution order;
storing the recipe data in a memory; and
executing, by the processing circuitry, a predetermined process by executing the plurality of functions based on the recipe data, wherein
the user interface further displays a data generation window including a third zone for setting the executing condition corresponding to the function when the executing condition can be set for the function, and the input operation is performed in the data generation window displayed by the user interface.

9. The information processing method as claimed in claim 8, wherein
the user interface displays a menu display window for displaying menu items corresponding to the recipe data, and the menu display window enables addition and/or deletion of a menu item in the menu display window.

10. The information processing method as claimed in claim 9, wherein the recipe data generated in the data generation window defines displaying position information for displaying in the menu display window.

11. The information processing method as claimed in claim 8, further comprising:
defining the executing order of the functions based on the selected executing order;
defining the executing condition based on a value input by a user corresponding to a selected information processing apparatus; and
generating the recipe data.

12. The information processing method as claimed in claim 8, wherein the plurality of functions include:
an image processing function which applies a predetermined process to image data input to the information processing apparatus;
a data outputting function which outputs the input image data or data processed by the image processing function; and
an information reporting function which reports an executing status and an executed result when the image processing function and/or the data outputting function is executed.

13. The information processing method as claimed in claim 8, wherein the plurality of functions are inverting or rotating functions.

14. The information processing method as claimed in claim 8, further comprising:
reading the recipe data from the memory; and
executing the plurality of functions according to the executing condition and the executing order defined by the recipe data.

15. A non-transitory computer readable medium storing computer executable instructions which, when executed by processing circuitry of an information processing apparatus, cause the information processing apparatus to perform a method comprising:
displaying a user interface including a first zone for receiving an input operation of a selection of a plug-in to execute a function to generate recipe data and a second zone for displaying an executing order of a plurality of functions corresponding to the selected plug-in;
generating the recipe data according to the input operation, the recipe data including an executing condition, the executing order and specific tags that define a start and an end of the execution order;
storing the recipe data in a memory; and
executing a predetermined process by executing the plurality of functions based on the recipe data, wherein
the displaying further includes displaying, as part of the user interface, a data generation window including a third zone for setting the executing condition corresponding to the function when the executing condition can be set for the function, and
the input operation is performed in the data generation window displayed by the user interface.

16. The non-transitory computer readable medium as claimed in claim 15, wherein
the user interface displays a menu display window for displaying menu items corresponding to the recipe data, and
the menu display window enables addition and/or deletion of a menu item in the menu display window.

17. The non-transitory computer readable medium as claimed in claim 16, wherein the recipe data generated in the data generation window defines displaying position information for displaying in the menu display window.

18. The non-transitory computer readable medium as claimed in claim 15, the method further comprising:
defining the executing order of the functions based on the selected executing order;
defining the executing condition based on a value input by a user corresponding to a selected information processing apparatus; and
generating the recipe data.

19. The non-transitory computer readable medium as claimed in claim 15, wherein the plurality of functions include:
an image processing function which applies a predetermined process to image data input to the information processing apparatus;
a data outputting function which outputs the input image data or data processed by the image processing function; and
an information reporting function which reports an executing status and an executed result when the image processing function and/or the data outputting function is executed.

20. The non-transitory computer readable medium as claimed in claim 15, wherein the plurality of functions are inverting or rotating functions.

21. The non-transitory computer readable medium as claimed in claim 15, the method further comprising:
reading the recipe data from the memory; and
executing the plurality of functions according to the executing condition and the executing order defined by the recipe data.

* * * * *